US012262308B2

(12) United States Patent
Le et al.

(10) Patent No.: US 12,262,308 B2
(45) Date of Patent: Mar. 25, 2025

(54) WIRELESS COMMUNICATION METHOD AND DEVICE WITH WIRELESS COMMUNICATION FUNCTION

(71) Applicant: Honor Device Co., Ltd., Shenzhen (CN)

(72) Inventors: Chao Le, Shenzhen (CN); Zhongyin Jiang, Shenzhen (CN); Bo Ling, Shenzhen (CN); Li Li, Shenzhen (CN); Daneng Wang, Shenzhen (CN); Han Jiang, Shenzhen (CN); Xianhui Lan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 334 days.

(21) Appl. No.: 17/792,648

(22) PCT Filed: Dec. 31, 2020

(86) PCT No.: PCT/CN2020/142195
§ 371 (c)(1),
(2) Date: Jul. 13, 2022

(87) PCT Pub. No.: WO2021/143541
PCT Pub. Date: Jul. 22, 2021

(65) Prior Publication Data
US 2023/0047724 A1 Feb. 16, 2023

(30) Foreign Application Priority Data
Jan. 14, 2020 (CN) .......................... 202010036703.5

(51) Int. Cl.
*H04W 48/16* (2009.01)
*H04W 48/10* (2009.01)
*H04W 52/02* (2009.01)

(52) U.S. Cl.
CPC .......... *H04W 48/16* (2013.01); *H04W 48/10* (2013.01); *H04W 52/0235* (2013.01)

(58) Field of Classification Search
CPC .. H04W 48/16; H04W 48/10; H04W 52/0235
(Continued)

(56) References Cited

U.S. PATENT DOCUMENTS 9,152,211 B2 * 10/2015 Gunn .................... G06F 3/0488
9,351,257 B2    5/2016 Heo et al.
(Continued)

FOREIGN PATENT DOCUMENTS

CA     3105663 A1 *  5/2020  ............ G06F 16/75
CN    101355786 A     1/2009
(Continued)

OTHER PUBLICATIONS

Shen et al., "Enhancing Mobile Apps to Use Sensor Hubs Without Programmer Effort," UBICOMP'15: Proceedings of The 2015 ACM International Joint Conference on Pervasive and Ubiquitous Computing, ACMPUB27, Osaka, Japan, pp. 227-238 (Sep. 7-11, 2015).

*Primary Examiner* — Mong-Thuy T Tran
(74) *Attorney, Agent, or Firm* — Leydig, Voit & Mayer, Ltd.

(57) ABSTRACT

A method is disclosed for a coprocessor of a device. The coprocessor may initiate, based on an instruction received from a processor, a wireless communication service required by the processor. The coprocessor further generates a drive instruction for driving a wireless communications module of the device to perform the wireless communication service, and then the coprocessor sends the drive instruction to the wireless communications module.

18 Claims, 11 Drawing Sheets

(58) Field of Classification Search
USPC .......................................................... 455/41.2
See application file for complete search history.

(56) References Cited

U.S. PATENT DOCUMENTS

| | | | |
|---|---|---|---|
| 9,706,493 B2 | 7/2017 | Kvetny et al. | |
| 9,819,537 B2 | 11/2017 | Palin et al. | |
| 9,877,283 B2 | 1/2018 | Chen | |
| 10,064,030 B2 | 8/2018 | Park et al. | |
| 10,209,062 B1 | 2/2019 | Le Grand | |
| 10,228,903 B2 | 3/2019 | Kang et al. | |
| 10,540,013 B2 | 1/2020 | Ryu et al. | |
| 10,912,131 B2 | 2/2021 | Lee et al. | |
| 11,153,721 B2 * | 10/2021 | Graefe | G08G 1/096791 |
| 11,310,646 B2 | 4/2022 | Yi et al. | |
| 2004/0204175 A1 * | 10/2004 | Karaoguz | H04W 52/028 455/41.1 |
| 2007/0140199 A1 * | 6/2007 | Zhao | H04W 52/287 370/338 |
| 2008/0229085 A1 | 9/2008 | Cornwell et al. | |
| 2009/0259865 A1 | 10/2009 | Sheynblat et al. | |
| 2010/0141400 A1 | 6/2010 | Radulescu et al. | |
| 2012/0230309 A1 | 9/2012 | Junk | |
| 2014/0136411 A1 | 5/2014 | Cho et al. | |
| 2015/0026580 A1 | 1/2015 | Kang et al. | |
| 2015/0099512 A1 | 4/2015 | Amano | |
| 2015/0223006 A1 | 8/2015 | Hornung et al. | |
| 2016/0095060 A1 | 3/2016 | Seddighrad et al. | |
| 2016/0100275 A1 | 4/2016 | Mswanadham et al. | |
| 2016/0112839 A1 * | 4/2016 | Choi | H04W 4/80 455/41.2 |
| 2016/0132369 A1 | 5/2016 | Lee et al. | |
| 2016/0150357 A1 * | 5/2016 | Jung | H04W 4/80 455/41.1 |
| 2016/0283284 A1 * | 9/2016 | Sun | G06F 1/329 |
| 2017/0185457 A1 * | 6/2017 | Sun | G06F 9/5044 |
| 2018/0329713 A1 | 11/2018 | Han et al. | |
| 2018/0359727 A1 | 12/2018 | Hori | |
| 2019/0014539 A1 | 1/2019 | Mathews et al. | |
| 2019/0154843 A1 * | 5/2019 | Kim | G01S 19/396 |
| 2021/0176810 A1 | 6/2021 | Chae | |
| 2023/0132947 A1 * | 5/2023 | Oh | G06F 3/017 345/179 |

FOREIGN PATENT DOCUMENTS

| | | |
|---|---|---|
| CN | 102594636 A | 7/2012 |
| CN | 103810594 A | 5/2014 |
| CN | 103856630 A | 6/2014 |
| CN | 103942176 A | 7/2014 |
| CN | 105325049 A | 2/2016 |
| CN | 106030556 A | 10/2016 |
| CN | 106197468 A | 12/2016 |
| CN | 106535313 A | 3/2017 |
| CN | 107408062 A | 11/2017 |
| CN | 107451090 A | 12/2017 |
| CN | 107918596 A | 4/2018 |
| CN | 108111975 A | 6/2018 |
| CN | 108476519 A | 8/2018 |
| CN | 108668239 A | 10/2018 |
| CN | 108924805 A | 11/2018 |
| CN | 109951893 A | 6/2019 |
| CN | 110401939 A | 11/2019 |
| CN | 111263339 A | 6/2020 |
| EP | 2713662 A2 | 4/2014 |
| EP | 2731066 A1 | 5/2014 |
| EP | 2759922 A2 | 7/2014 |
| EP | 2999276 A1 | 3/2016 |
| JP | 2011520326 A | 7/2011 |
| JP | 2015536088 A | 12/2015 |
| RU | 2564247 C2 | 9/2015 |
| WO | 2016090565 A1 | 6/2016 |
| WO | 2016209521 A1 | 12/2016 |
| WO | 2019112268 A1 | 6/2019 |
| WO | 2019192030 A1 | 10/2019 |

* cited by examiner

WIRELESS COMMUNICATION METHOD AND DEVICE WITH WIRELESS COMMUNICATION FUNCTION

CROSS-REFERENCE TO RELATED APPLICATIONS

This application is a national stage of International Application No. PCT/CN2020/142195, filed on Dec. 31, 2020, which claims priority to Chinese Patent Application No. 202010036703.5, filed on Jan. 14, 2020, both of which are incorporated herein by reference in their entireties.

TECHNICAL FIELD

This application relates in general to the field of wireless communication of electronic devices, and in particular, to a wireless communication method and a device with a wireless communication function.

BACKGROUND

Types and quantities of electronic devices (mobile phones, tablet computers, TVs, PCs, speakers, watches, vehicular devices, and the like) are increasing. These devices usually use short-range wireless communications technologies and standards such as EEE 802.11 (WLAN or Wi-Fi), or Bluetooth (Bluetooth, BT) or Bluetooth low energy (Bluetooth low energy, BLE) for connection and/or communication with each other. In addition, the short-range wireless communications technologies are also more widely used in application scenarios such as home, office, social communication, sports and health, and vehicles.

SUMMARY

Some embodiments disclosed herein provide a wireless communication method and a device with a wireless communication function.

To deal with the foregoing scenarios, according to a first aspect, some embodiments provide a wireless communication method. The method can be used for a coprocessor of a device. The coprocessor receives an instruction from a processor of the device first, where the instruction is used to instruct the coprocessor to perform a wireless communication service, and the wireless communication service may include, for example, at least one of wireless broadcasting, wireless scanning, and wireless data synchronization. The coprocessor can initiate, based on the instruction received from the processor, the wireless communication service required by the processor. To execute the wireless communication service, the coprocessor further generates a drive instruction for driving a wireless communications module of the device to perform the wireless communication service, and then the coprocessor sends the drive instruction to the wireless communications module. The wireless communications module is, for example, a Bluetooth or Bluetooth low energy communications module.

It can be learned from the foregoing embodiments according to the first aspect that the coprocessor in the technical solution can execute a wireless communication application based on an instruction of an application processor of the device, and can drive the wireless communications module of the device accordingly, so that the coprocessor according to the technical solution can implement functions such as device discovery, obtaining of device link establishment information, and device state synchronization for other user equipment.

With reference to the first aspect, in some embodiments, the instruction received by the coprocessor from the processor further includes information that the processor is about to sleep or that a processor load is high.

It can be learned from the foregoing embodiments with reference to the first aspect that the embodiments further have the following advantages. For example, the coprocessor can execute the wireless communication application while the processor is sleeping, thereby effectively reducing power consumption of the device. In addition, when the processor's service load is high or full, the coprocessor can share the processor's wireless communication service, thereby alleviating a situation that the processor's service load is high.

With reference to the first aspect, in some embodiments, the coprocessor receives, from the wireless communications module, data of the wireless communication service obtained during the wireless communication.

With reference to the first aspect, in some embodiments, the coprocessor can generate a data filter based on the wireless communication service, such as a wireless scanning service, and then send the data filter to the wireless communications module, where the data filter is configured at least partially to instruct the wireless communications module to send the data of the wireless communication service to at least one of the processor and the coprocessor.

With reference to the first aspect, in some embodiments, the coprocessor can further store the data in the coprocessor: or the coprocessor can further parse synchronization data sent by other devices based on the wireless communication service, such as a data synchronization service, and store the parsed data in the coprocessor.

With reference to the first aspect, in some embodiments, the coprocessor can further read and send the data stored in the coprocessor to the processor in response to a request from the processor.

It can be learned from the foregoing embodiments with reference to the first aspect that the embodiments further have the following advantages. The data obtained by the wireless communication is pre-cached in the coprocessor, so that speeds of device discovery, device link establishment and data synchronization can be further increased. In addition, when the user uses user equipment, the increase in the speeds can be perceived, thereby optimizing user experience.

With reference to the first aspect, in some embodiments, the coprocessor can further determine whether a size of the data stored in the coprocessor is greater than or equal to a threshold; and send the stored data to the processor if the size of the stored data is greater than or equal to the threshold.

With reference to the first aspect, in some embodiments, the coprocessor can further determine whether a value of at least a part of the stored parsed data is smaller than the threshold; and the coprocessor sends the at least a part of the data to the processor if the value of the at least a part of the data is smaller than the threshold.

With reference to the first aspect, in some embodiments, the coprocessor may include a sensor hub configured at least partially to process sensor data from one or more sensors of the device.

It can be learned from the foregoing embodiments with reference to the first aspect that the embodiments further have the following advantages. For example, the problems that an existing sensor hub does not have the ability to process wireless communication data and cannot transmit data with the wireless communications module are resolved.

With reference to the first aspect, in some embodiments, the wireless communication includes at least one of Bluetooth communication and Bluetooth low energy communication.

According to a second aspect, embodiments provide a wireless communication method, which is applied to a wireless communications module of a device. The wireless communications module receives a drive instruction from a coprocessor of the device, where the drive instruction is generated by the coprocessor in response to an instruction from a processor of the device for instructing the coprocessor to perform a wireless communication service, and the drive instruction is used to drive the wireless communications module to perform wireless communication of the wireless communication service; and the wireless communication is performed based on the drive instruction.

With reference to the second aspect, in some embodiments, the wireless communications module can obtain data of the wireless communication service during the wireless communication.

With reference to the second aspect, in some embodiments, the wireless communications module can further receive a data filter from the coprocessor, and the data filter is configured at least partially to instruct the wireless communications module to send the data to at least one of the processor and the coprocessor.

With reference to the second aspect, in some embodiments, the wireless module may further receive information from the coprocessor for indicating that the processor is about to sleep.

With reference to the second aspect, in some embodiments, the wireless communications module can further send, when receiving information that the processor is about to sleep, an instruction for waking up the dormant processor to the processor in response to determining to send the data of the wireless communication service to the processor.

With reference to the second aspect, in some embodiments, the coprocessor may include a sensor hub configured at least partially to process sensor data from one or more sensors of the device.

With reference to the second aspect, in some embodiments, the wireless communication service includes at least one of wireless broadcasting, wireless scanning and wireless data synchronization, and the wireless communication includes at least one of Bluetooth communication and Bluetooth low energy communication.

According to a third aspect, embodiments provide a wireless communications device. The device includes: a processor: a coprocessor; and a wireless communications module. The wireless communications module is coupled to the processor and the coprocessor in a communicating manner. The processor of the device may be configured to send an instruction to the coprocessor, where the instruction is used to instruct the coprocessor to perform a wireless communication service, and the wireless communication service may include, for example, at least one of wireless broadcasting, wireless scanning and wireless data synchronization. The coprocessor may be configured to initiate, based on the instruction received from the processor, the wireless communication service required by the processor. To execute the wireless communication service, the coprocessor further generates a drive instruction for driving a wireless communications module of the device to perform the wireless communication service, and then the coprocessor sends the drive instruction to the wireless communications module. In addition, the wireless communications module is configured to receive a drive instruction from the coprocessor, and perform wireless communication related to the wireless communication service based on the drive instruction.

It can be learned from the foregoing embodiments with reference to the third aspect that the embodiments further have the following advantages. For example, the coprocessor in the technical solution can execute a wireless communication application based on an instruction of an application processor of the device, and can drive the wireless communications module of the device accordingly, so that the coprocessor according to the technical solution can implement functions such as device discovery, obtaining of device link establishment information, and device state synchronization for other user equipment.

With reference to the third aspect, in some embodiments, the processor may be further configured to send the foregoing instruction before the processor sleeps, and the instruction may further include information that the processor is about to sleep.

It can be learned from the foregoing embodiments with reference to the third aspect that the embodiments further have the following advantages. For example, the coprocessor can execute the wireless communication application while the processor is sleeping, thereby effectively reducing power consumption of the device.

With reference to the third aspect, in some embodiments, the processor is further configured to send the instruction when a processor load is high, and the instruction further includes information that the processor load is high.

It can be learned from the foregoing embodiments with reference to the third aspect that the embodiments further have the following advantages. For example, when the processor's service load is high or full, the coprocessor can share the processor's wireless communication service, thereby alleviating a situation that the processor's service load is high.

With reference to the third aspect, in some embodiments, the processor is further configured to include a plurality of data links, and one of the data links is configured to send the instruction to the coprocessor and receive data of the wireless communication service of the coprocessor.

With reference to the third aspect, in some embodiments, when the instruction indicates that the wireless communication service is wireless broadcasting, the coprocessor is further configured to: initiate a wireless broadcasting service: generate a first broadcast message for sending to at least one second device other than the device; and generate a drive instruction for driving the wireless communications module to send the first broadcast message.

With reference to the third aspect, in some embodiments, the first broadcast message may include at least one of the following: device information of the device, a request of the device for second synchronization data of the at least one second device, and first synchronization data of the device.

With reference to the third aspect, in some embodiments, when the instruction indicates that the wireless communication service is wireless scanning, the coprocessor is further configured to: initiate a wireless scanning service; and generate a drive instruction for driving the wireless communications module to obtain a second broadcast message from at least one second device other than the device.

With reference to the third aspect, in some embodiments, the coprocessor is further configured to receive, from the wireless communications module, a second broadcast message from at least one second device other than the device.

With reference to the third aspect, in some embodiments, the second broadcast message includes at least one of the following: device information of at least one second device, a request of the at least one second device for first synchronization data of the device, and second synchronization data of the at least one second device.

With reference to the third aspect, in some embodiments, the coprocessor is further configured to generate a data filter based on a wireless scanning service, and send the data filter to the wireless communications module, where the data filter is configured at least partially to instruct the wireless communications module to send the second broadcast message to at least one of the processor and the coprocessor.

With reference to the third aspect, in some embodiments, the coprocessor is further configured to: store the second broadcast message in the coprocessor; and send the stored second broadcast message to the processor in response to a request from the processor.

It can be learned from the foregoing embodiments with reference to the third aspect that the embodiments further have the following advantages. The data obtained by the wireless communication is pre-cached in the coprocessor, so that speeds of device discovery, device link establishment and data synchronization can be further increased. In addition, when the user uses user equipment, the increase in the speeds can be perceived, thereby optimizing user experience.

With reference to the third aspect, in some embodiments, the coprocessor is further configured to: store the second broadcast message in the coprocessor: determine whether a size of the stored second broadcast message is greater than or equal to a threshold; and send the stored second broadcast message to the processor in response to determining that the size of the stored second broadcast message is greater than or equal to the threshold.

With reference to the third aspect, in some embodiments, the coprocessor is further configured to: when the second broadcast message includes the second synchronization data, determine whether a value of at least a part of the second synchronization data is smaller than the threshold: send the at least a part of the data to the processor in response to determining that the value is smaller than the threshold.

With reference to the third aspect, in some embodiments, the coprocessor is further configured to: when the first broadcast message includes the first synchronization data, determine whether a size of the first synchronization data is smaller than the threshold; in response to determining that the size of the first synchronization data is smaller than the threshold, generate a drive instruction for driving the wireless communications module to send the first synchronization data through wireless broadcasting; and in response to determining that the size of the first synchronization data is greater than or equal to the threshold, generate a drive instruction for driving the wireless communications module to send the first synchronization data by using a wireless link.

With reference to the third aspect, in some embodiments, the coprocessor includes a sensor hub configured at least partially to process sensor data from one or more sensors of the device.

It can be learned from the foregoing embodiments with reference to the third aspect that the embodiments further have the following advantages. For example, the problems that an existing sensor hub does not have the ability to process wireless communication data and cannot transmit data with the wireless communications module are resolved.

With reference to the third aspect, in some embodiments, the wireless broadcasting includes at least one of Bluetooth advertising and Bluetooth low energy advertising, and the wireless scanning includes at least one of Bluetooth scanning and Bluetooth low energy scanning.

According to a fourth aspect, some embodiment disclosed herein provide a computer readable storage medium. The storage medium may be non-volatile. The storage medium includes instructions, and after the instructions are executed, the method according to any one of the foregoing aspects or embodiments is performed.

DESCRIPTION OF EMBODIMENTS

Figure 1A:
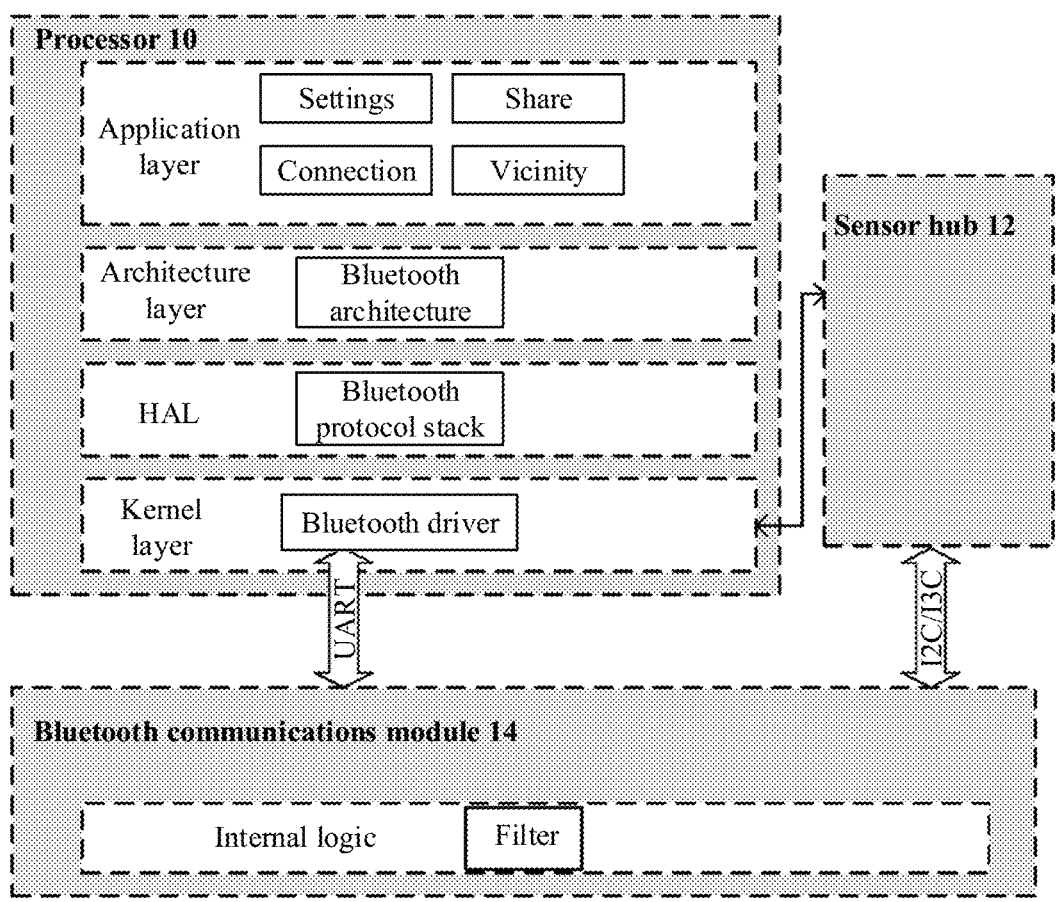
FIG. 1a is a schematic diagram of modules of user equipment in the prior art.

The embodiments disclosed herein are further described in details below with reference to accompanying drawings. It may be understood that illustrative embodiments of the present disclosure include, but are not limited to, a wireless communication method, device and system. Specific embodiments described herein are intended only to explain the technical solutions, but not to limit the scope of the disclosure. In addition, for ease of description, the accompanying drawings only illustrate a part of the structure related to the disclosure instead of all of the structure or process.

The following specific embodiments illustrate the embodiments of this disclosure, and those skilled in the art can easily understand other advantages and effects of this application from the contents disclosed in the present specification. Although the description of this disclosure is described with reference to preferred embodiments, it does not mean that features of this invention are limited to this embodiment. On the contrary, the purpose of describing the invention with reference to embodiments is to cover other options or modifications that may be extended based on the claims. To provide a further appreciation of this disclosure, many specific details are included in the following description. This disclosure may also be practiced without these details. In addition, to avoid confusing or obscuring key points of this disclosure, some specific details are omitted in the description. It should be noted that the embodiments of this disclosure and the features in the embodiments may be combined with each other provided that no conflict occurs.

Further, various operations are described as a plurality of discrete operations in a manner that is most helpful for understanding the illustrative embodiments. However, the order described should not be interpreted as implying that these operations must depend on the order. In particular, these operations need not be performed in the order of presentation.

Unless otherwise specified in the context, the terms "including", "having", and "comprising" are synonyms. The phrase "A/B" means "A or B". The phrase "A and/or B" means "(A and B) or (A or B)".

In some cases, the disclosed embodiments may be implemented in hardware, firmware, software, or any combination thereof. The disclosed embodiments can be further implemented as instructions carried by or stored on one or more transitory or non-transitory machine readable (for example, computer readable) storage media, and the instructions can be read and executed by one or more processors. For example, the instructions can be distributed by using a network or by using other computer readable media. Therefore, a machine readable medium may include any mechanism for storing or transmitting information in a form readable by a machine (for example, a computer), but is not limited to, a floppy disk, an optical disc, a read-only memory (CD-ROM), a magneto-optical disc, a read-only memory (ROM), a random access memory (RAM), an erasable programmable read-only memory (EPROM), an electrically erasable programmable read-only memory (EEPROM), a magnetic or optical card, a flash memory, or a tangible machine readable memory that transmits information by using the Internet by using electric, optical, acoustic or other forms of propagation signals (for example, carrier waves, infrared signals and digital signals). Therefore, the machine readable medium includes any type of machine readable medium suitable for storing or transmitting electronic instructions or information in a form readable by a machine (for example, a computer).

In the accompanying drawings, some structural or method features are shown in a specific arrangement and/or order. However, it should be understood that such a specific arrangement and/or ordering may not be required. In some embodiments, these features may be arranged in a manner and/or order different from as shown in the illustrative accompanying drawings. In addition, the inclusion of structural or methodological features in a particular figure does not mean implying that such features are required in all embodiments, and in some embodiments, these features may not be included or may be combined with other features.

It should be understood that although the terms "first", "second", and the like may be used herein to describe various units or data, these units or data should not be limited by these terms. These terms are used only to distinguish one feature from another. For example, without departing from the scope of example embodiments, a first feature may be referred to as a second feature, and similarly the second feature may be referred to as the first feature.

It should be noted that, in the present specification, similar reference numerals and letters indicate similar terms in the following accompanying drawings. Therefore, once a certain term is defined in one accompanying drawing, it does not need to be further defined and explained in the subsequent accompanying drawings.

To make the objectives, technical solutions, and advantages of this disclosure clearer, the following further describes embodiments of this disclosure in detail with reference to the accompanying drawings.

As used herein, the term "module or unit" may refer to or include an application-specific integrated circuit (ASIC), an electronic circuit, a processor (shared, dedicated or group) and/or a memory (shared, dedicated or group) that executes one or more software or firmware programs, a combinational logic circuit, and/or other suitable components that provide the described functions, or may be part of the application-specific integrated circuit (ASIC), the electronic circuit, the processor (shared, dedicated or group) and/or the memory (shared, dedicated or group) that executes one or more software or firmware programs, the combinational logic circuit, and/or other suitable components that provide the described functions.

Figure 1B:
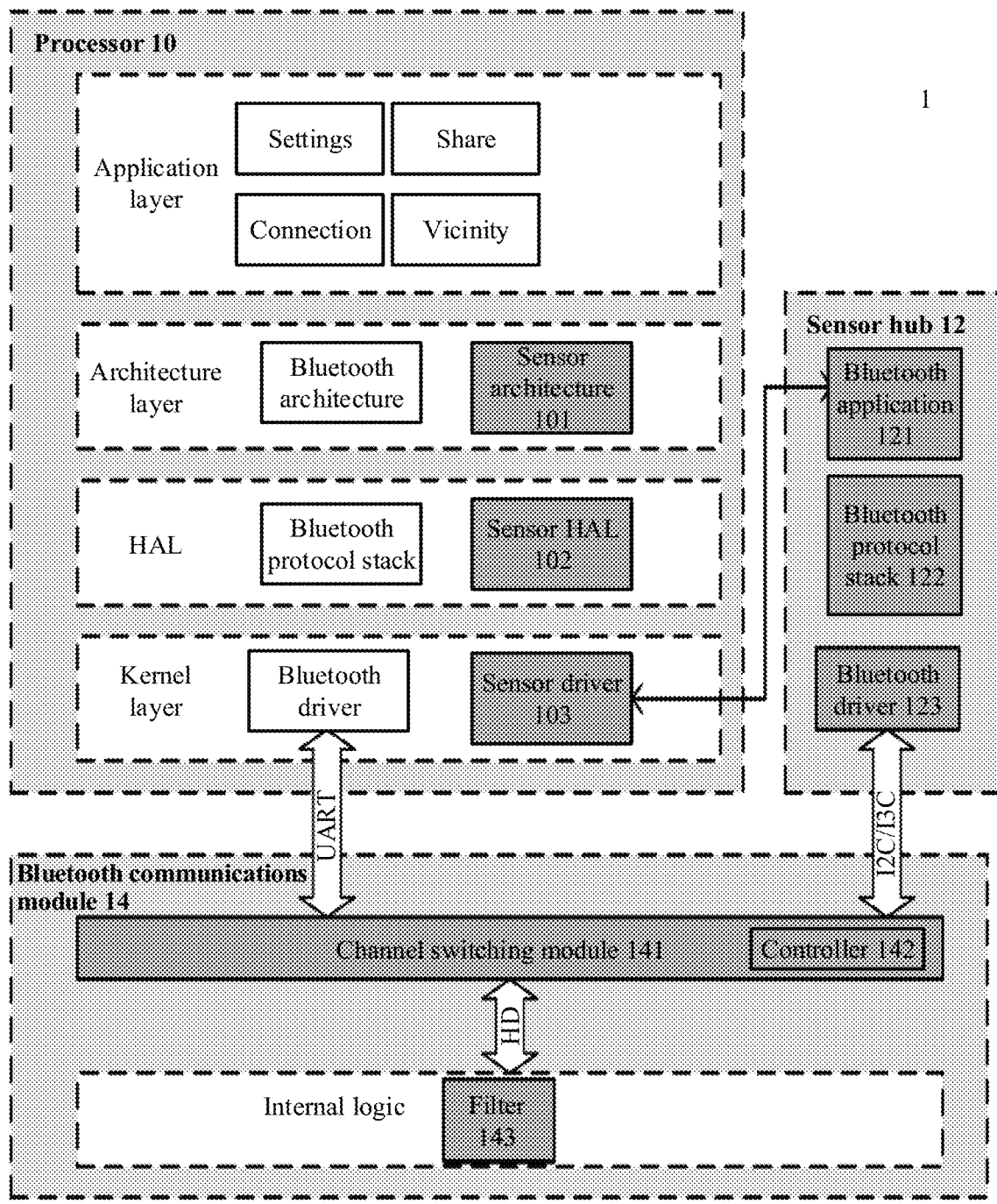
FIG. 1b is a schematic diagram of modules of user equipment according to a schematic embodiment.

FIG. 1b is a schematic diagram of modules of user equipment according to an embodiment. Example user equipment 1 includes, but is not limited to, a laptop device, a desktop computer, a handheld PC, a personal digital assistant, an embedded processor, a digital signal processor (DSP), a graphics device, a video game device, a set-top box, a microcontroller, a cellular phone, a portable media player, a handheld device, a wearable device (for example, display glasses or goggles, a head-mounted display (HMD), a watch, a head-mounted device, an armband or jewelry), virtual reality (VR) and/or augmented reality (AR) devices, an Internet of Things (IoT) device, a smart audio system, an in-vehicle infotainment device, a streaming media client device, an e-book reading device, a POS machine, a control system for an electric vehicle, and various other electronic devices. A plurality of apparatuses and electronic devices capable of including the processor and/or other execution logic disclosed herein are usually suitable.

As shown in FIG. 1b, the user equipment 1 may include one or more (only one is shown in the figure) processors 10, a sensor hub 12, and a Bluetooth communications module 14. The processor 10 may include, but is not limited to, a central processing unit (CPU), an application processor, a graphics processing unit (GPU), a digital signal processor (DSP), a micro-programmed control unit (MCU), an AI (artificial intelligence) processor or a field programmable gate array (FPGA), and other processing modules or processing circuits. In the embodiments herein, the processor 10 may be configured to implement one or more of various embodiments described below.

In a possible embodiment, the processor 10) may run an operating system of the user equipment 1, such as Android, IOS, Windows OS, Linux, and Harmony operating system. In some other possible embodiments, the processor 10 may run a specific application.

The sensor hub 12, or referred to as sensor hub or a sensor coprocessor, is mainly configured to connect various sensor devices and process data from the various sensor devices with low power consumption. The sensor hub 12 may include, but is not limited to, low-power processing modules or processing circuits such as a low-power application processor, a coprocessor, and a micro-programmed control unit. The sensor hub 12 can usually process, for example, data of sensors such as an accelerometer, a magnetometer, a gyroscope, an ambient light sensor, an optical proximity sensor, a barometer/pressure and a humidometer, and perform fusion processing on various sensor data.

In various embodiments herein, the sensor hub 12 may further process data related to Bluetooth communication, especially data related to BLE communication.

In an example solution of FIG. 1b, the Bluetooth communications module 14 may be configured to communicate by using Bluetooth as well as Bluetooth low energy (BLE). The term "Bluetooth" has the full scope of its ordinary meaning, and includes at least any of various embodiments of the existing Bluetooth standard, including Bluetooth low energy (BLE), and including future embodiments of the Bluetooth standard, and the like. For example, a Bluetooth connection includes a Bluetooth connection based on the Bluetooth protocol 4.x, such as 4.2, or includes a Bluetooth connection based on the Bluetooth protocol 5.x, such as 5.0. In addition, the Bluetooth connection may further include Bluetooth low energy (BLE). Compared with classic Bluetooth, the BLE aims to significantly reduce power consumption and cost while maintaining a communication range similar to that of the classic Bluetooth. In some embodiments, the Bluetooth communications module 14 may be additionally combined with other communications modules, such as a module for Wi-Fi or WLAN (for example, 802.11) communication. For simplicity, only the application of the BLE technology in various embodiments is described below: It may be understood that the classic Bluetooth, Wi-Fi and other short-range communications technologies can be applied in various embodiments of the present specification. Each module is described in detail below: Usually, in the prior art, as shown in FIG. 1a, the Bluetooth communications module 14 transmits data with the processor 10 by using a universal asynchronous receiver transmitter (UART), and implements a Bluetooth function based on an instruction of the processor 10. A UART interface is a universal serial data bus for asynchronous communication, and the bus may be a bidirectional communication bus, which converts to-be-transmitted data between serial communication and parallel communication.

According to the embodiments, as shown in FIG. 1b, the Bluetooth communications module 14 can further transmit data with the sensor hub 12 by using an inter integrated circuit (I2C) or an improved inter integrated circuit (improved inter integrated circuit, I3C), and implement Bluetooth functions such as Bluetooth advertising (ADV), Bluetooth scanning, link establishment and data synchronization based on an instruction of the sensor hub 12. An I2C interface is a bidirectional synchronous serial bus, and includes a serial data line (SDA) and a serial clock line (SCL). I3C is an improvement to I2C, is compatible with the I2C protocol and combines the advantages of I2C (double-line, simple) and SPI (low power consumption, high speed). Referring to FIG. 1a and FIG. 1b, the processor 10 further shows a Bluetooth low energy (BLE) software architecture in an example Android system hierarchical architecture.

A layered architecture divides the software into several layers, and each layer has a clear role and division of labor. The layers communicate with each other by using a software interface. In some embodiments, the Android system is divided into four layers, which are respectively an application layer, an application framework layer, an HAL (hardware abstract layer), and a kernel layer from top to bottom.

Only each module related to Bluetooth communication in the present specification is described below.

The application layer may include a series of application packages. As shown in FIG. 1a and FIG. 1b, for Bluetooth/Bluetooth low energy communication, corresponding Bluetooth application packages may include applications such as settings, sharing, connection, and vicinity.

The application framework layer provides an application programming interface (API) and a programming framework for applications at the application layer. The application framework layer includes some predefined functions.

As shown in FIG. 1b, the application framework layer may include a Bluetooth architecture, a sensor architecture 101, and the like.

The hardware abstract layer provides a unified access interface for different hardware devices. As shown in FIG. 1b, the HAL may include a Bluetooth protocol stack and a sensor HAL 102.

The kernel layer is a layer between hardware and software. The kernel layer includes at least various drivers, such as a Bluetooth driver and a sensor driver 103 shown in FIG. 1b.

As shown in FIG. 1a, in an existing Bluetooth workflow, a downlink transmission path of Bluetooth data is to start the Bluetooth application in the application layer, invoke an interface in the Bluetooth architecture by the Bluetooth application, invoke the Bluetooth driver in the kernel layer by using the Bluetooth protocol of the Bluetooth protocol stack, start the Bluetooth communications module 14 by the Bluetooth driver by using the UART, and finally send data by using the Bluetooth communications module 14. On the contrary, an uplink transmission path of Bluetooth data is to receive, by using the Bluetooth communications module 14, Bluetooth communication data sent by other devices, perform uplink transmission of the data to the Bluetooth driver by using the UART, and then enable the data to reach the Bluetooth application at the application layer by using the Bluetooth protocol stack and the Bluetooth architecture.

As shown in FIG. 1a, the existing sensor hub does not have the ability to process Bluetooth communication data, cannot transmit data with the Bluetooth communications module. In this case, for the existing solution in FIG. 1a, in a scenario of Bluetooth communication, on one hand, for example, BLE needs to be used to query a list of nearby devices, and BLE scanning is initiated during the query, which leads to a poorer real-time performance of Bluetooth communication. On the other hand, for example, after device link establishment is initiated, key information interaction is first completed through BLE advertising, and then WLAN link establishment is initiated, which results in a slower link establishment speed. In addition, when the device initiates data synchronization such as state synchronization through the BLE advertising, other devices are frequently awakened by the BLE advertising, causing a problem of higher power consumption.

According to the embodiments, as shown in FIG. 1b, the sensor architecture 101, the sensor HAL 102 and the sensor driver 103 are modules added based on the existing Bluetooth communication software architecture of FIG. 1a, and form a new Bluetooth data transmission path, so that the processor 10 can obtain data related to Bluetooth communication from the sensor hub 12 and send data related to Bluetooth communication to the sensor hub 12. In an example. Bluetooth data from the sensor hub 12 can be uplinked sequentially by using the sensor driver 103, the sensor HAL 102, and the sensor architecture 101 to reach the Bluetooth application at the application layer. On the contrary. Bluetooth data from the Bluetooth application at the application layer can be downlinked to the sensor hub 12 by using the sensor architecture 101, the sensor HAL 102, and the sensor driver 103.

Further referring to FIG. 1b, the sensor hub 12 includes a Bluetooth application 121, a Bluetooth protocol stack 122, and a Bluetooth driver 123. The Bluetooth application 121, the Bluetooth protocol stack 122 and the Bluetooth driver 123 correspond to the Bluetooth architecture of the application framework layer, the Bluetooth protocol stack in the HAL and the Bluetooth driver in the kernel layer, respectively. Specifically, the Bluetooth application 121 is implemented in the sensor hub 12 by transplanting at least some functions of the Bluetooth architecture of the application framework layer. For example, the Bluetooth architecture of the application framework layer coded by JAVA is rewritten and transplanted to the sensor hub 12 by using C language to form the Bluetooth application 121. Similarly, by using the foregoing method, at least some functions of the Bluetooth protocol stack and the Bluetooth driver, such as Bluetooth advertising. Bluetooth scanning, link establishment and data synchronization, are transplanted from the processor end to the sensor hub 12 to form the Bluetooth protocol stack 122 and the Bluetooth driver 123. In some embodiments, for example, the Bluetooth protocol stack 122 may include corresponding Bluetooth protocols for advertising and scanning, and the Bluetooth driver 123 may include some or all drivers that drive the Bluetooth communications module 14.

In some embodiments, the Bluetooth protocol stack 122 has the same security protocol as the Bluetooth protocol stack of the processor 10, so that data security of the Bluetooth communication by using the sensor hub 12 can be protected by the Bluetooth security protocol.

As shown in FIG. 1b, the Bluetooth communications module 14 may include a channel switching module 141, a controller 142, and a filter 143 stored (registered) in underlying internal logic. The filter 143 is configured to filter a result of the Bluetooth scanning such as BLE scanning. For example, when the processor 10 initiates the Bluetooth scanning, the filter 143 is generated based on a requirement of the Bluetooth scanning, and then transmitted from the processor 10 to the Bluetooth communications module 14 by using the UART, and stored in the underlying internal logic. In some other examples, the filter 143 can be generated in the Bluetooth application 121 of the sensor hub 12 based on the requirement of Bluetooth scanning, then transmitted from the sensor hub 12 to the Bluetooth communications module 14 by using the I2C/I3C, and stored in the underlying internal logic. The channel switching module 141 determines to send BLE data to at least one of the processor 10 and the sensor hub 12 based on an instruction of the controller 142.

In some embodiments, when the processor 10 executes BLE communication-related applications such as advertising, scanning, and data synchronization by using the sensor hub 12, downlinked BLE data of the processor 10 is sent to the sensor hub 12 sequentially by using the sensor architecture 101, the sensor HAL 102 and the sensor driver 103. After the sensor hub 12 receives the BLE data, the Bluetooth application 121 determines an application (service) to be executed, such as BLE advertising, BLE scanning and BLE state synchronization. An instruction to execute a corresponding service operation is transmitted to the Bluetooth protocol stack 122, and then the Bluetooth driver 123 is invoked to start the Bluetooth driver. The Bluetooth drive instruction is transmitted to the Bluetooth communications module 14 by using the I2C/I3C interface, and the Bluetooth communications module 14 starts BLE advertising and/or BLE scanning based on the Bluetooth drive instruction. The uplink transmission path of Bluetooth data obtained by the Bluetooth communications module 14 is implemented substantially by reverse transmission of the foregoing downlink transmission path, and the data transmission of Bluetooth communication is described in detail with reference to FIG. 2 to FIG. 4.

After the foregoing Bluetooth communication manner is adopted, some functions (for example, ADV/SCAN/BLE link establishment) and services of the Bluetooth protocol stack are set to the sensor hub 12, so that the user equipment according to the embodiments can perform BLE advertising and/or BLE scanning on the sensor hub 12 side when the processor 10 sleeps, to implement functions such as device discovery, obtaining of device link establishment information, device state synchronization for other user equipment, and power consumption of the device can be effectively reduced.

Further, the user equipment according to the embodiments can increase speeds of device discovery, device link establishment and data synchronization. In addition, in one or more embodiments, when the user uses the user equipment, the increase in the speeds can be perceived, thereby optimizing user experience.

Example communication processes in which the foregoing improved user equipment 1 implements Bluetooth advertising. Bluetooth scanning, Bluetooth link establishment and data synchronization are described separately below with reference to basic scenarios of Bluetooth communication. The detailed description of the communication processes and the comparison with the prior art further illustrate the significant technical effects achieved by the user equipment 1 in Bluetooth communication.

Bluetooth communication processes in some embodiments are further described below with reference to FIG. 2 to FIG. 4. In some embodiments, these Bluetooth communication processes may be implemented on, for example, the user equipment 1 shown in FIG. 1b.

Figure 2:
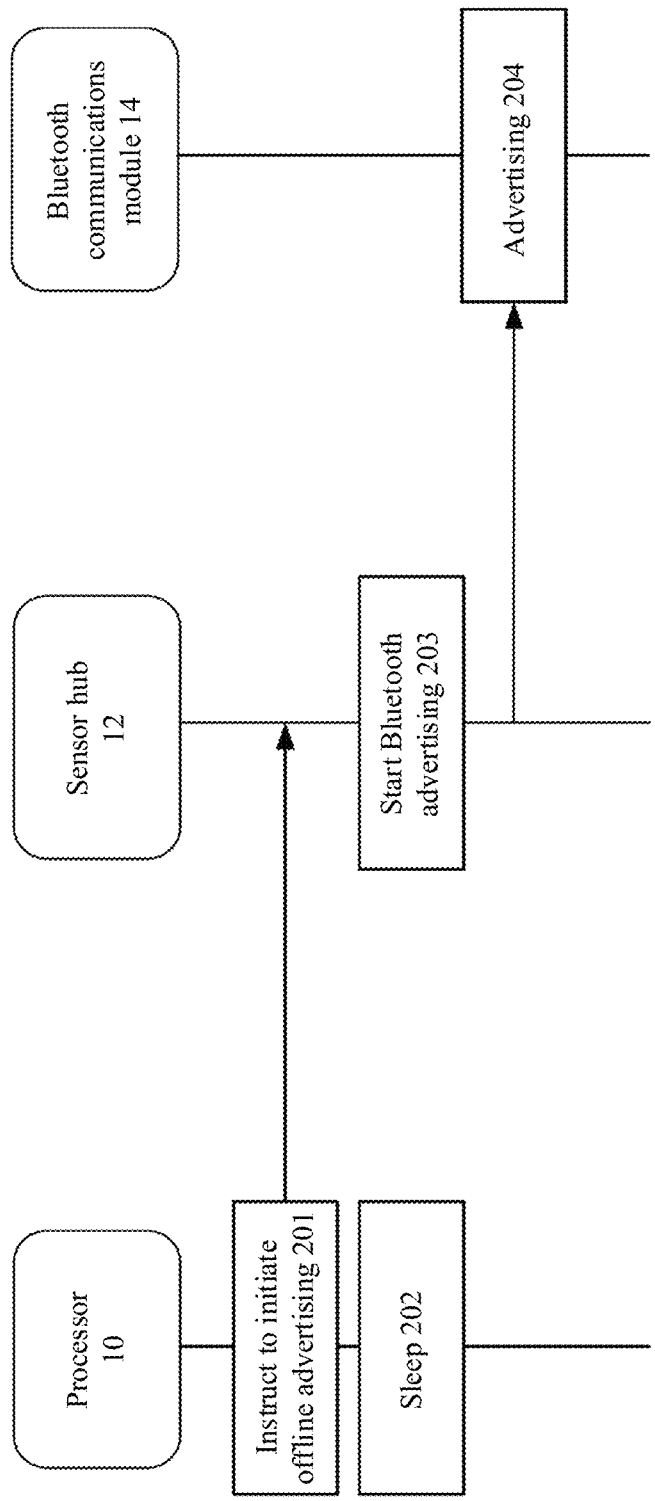
FIG. 2 is a schematic flowchart of Bluetooth advertising according to a schematic embodiment.

FIG. 2 is a flowchart of Bluetooth advertising according to an embodiment.

As shown in FIG. 2, when the user equipment 1 receives a user instruction and needs to initiate Bluetooth advertising by using a Bluetooth application, at block 201, the processor 10 instructs to initiate offline advertising. For example, the processor 10 may send an instruction for initiating offline Bluetooth advertising to the sensor hub 12. The instruction for offline Bluetooth advertising is used to instruct the processor 10 to go offline after the instruction is sent, to instruct the sensor hub 12 that the processor 10 is about to go offline, and to instruct the sensor hub 12 to start standard Bluetooth advertising or BLE advertising. Here, the so-called "offline" means that the processor 10 goes to sleep after sending an instruction for offline Bluetooth advertising. The processor 10 in the sleep state does not process multiple applications such as the Bluetooth applications, thereby achieving the purpose of saving energy for the user equipment 1. That is, at block 202, the processor 10 sleeps and enters a sleep state. Bluetooth low energy advertising is used as an example for description below:

At block 203, the sensor hub 12 initiates Bluetooth advertising. Specifically, after receiving an instruction from the processor 10 for starting offline Bluetooth advertising such as BLE advertising, the sensor hub 12 starts the BLE advertising application in the Bluetooth application 121, and the Bluetooth protocol stack 122 sends an instruction to the Bluetooth driver 123 based on the Bluetooth advertising protocol. The Bluetooth driver 123 generates a Bluetooth advertising drive instruction, and sends the Bluetooth advertising drive instruction to the Bluetooth communications module 14 by using the I2C/I3C interface. After receiving the drive instruction, the Bluetooth communications module 14 performs Bluetooth advertising (block 204). Therefore, during the process of performing, for example, BLE advertising, the processor 10 can remain in a sleep state, and data processing related to the advertising is performed in the sensor hub 12. Therefore, power consumption of the user equipment 1 is effectively reduced after the foregoing communication method is adopted.

The Bluetooth scanning process of the user equipment 1 is further described below. On the basis of FIG. 2, FIG. 3 and FIG. 4 are flowcharts of possible Bluetooth scanning according to an embodiment.

Figure 3:
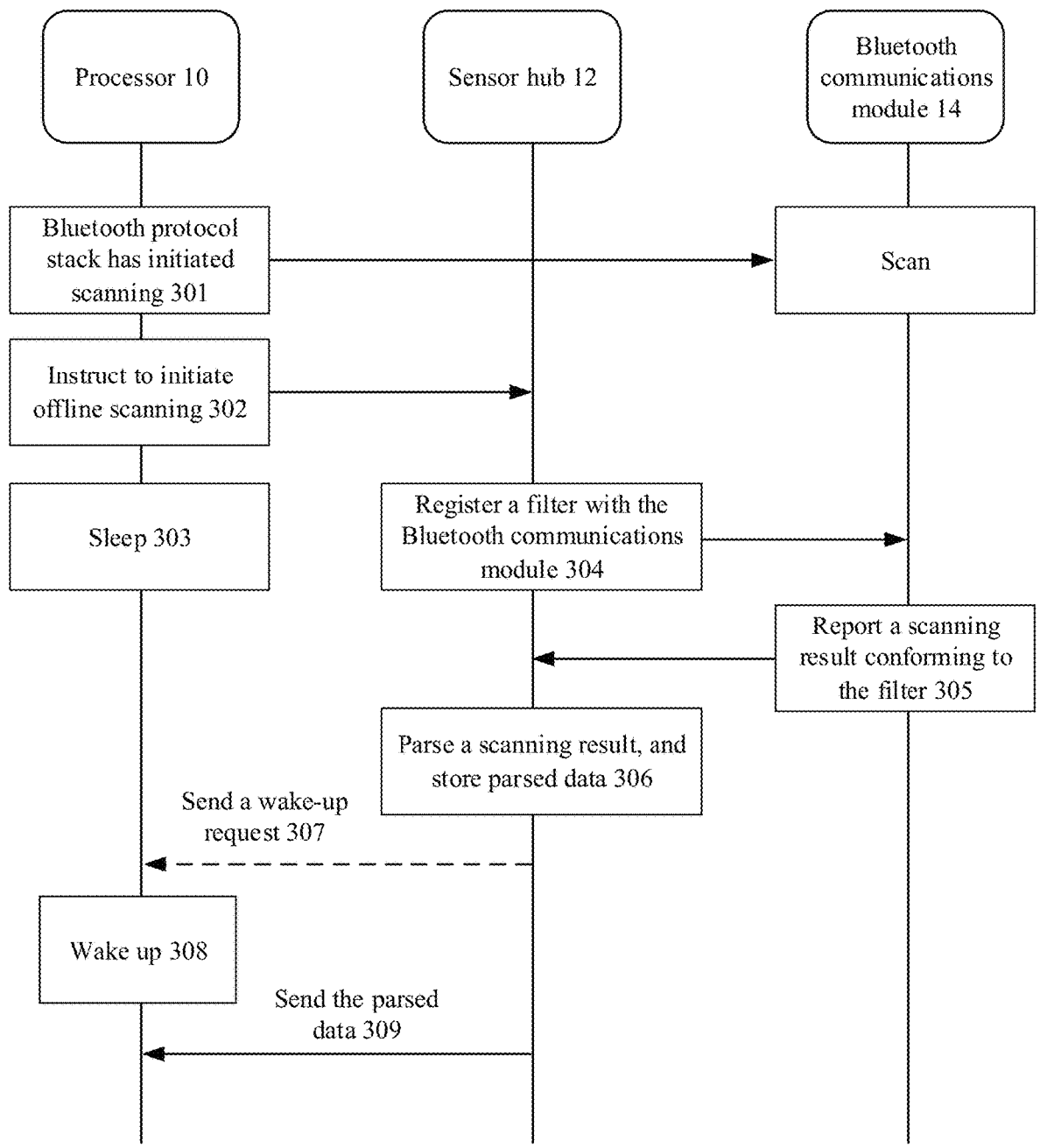
FIG. 3 is a schematic flowchart of Bluetooth scanning according to an embodiment.

FIG. 3 shows a process in which the user equipment 1 performs Bluetooth scanning in a possible situation. As shown in FIG. 3, when the user equipment 1 receives a user instruction and needs to initiate Bluetooth scanning by using a Bluetooth application, at block 302, the processor 10 instructs to initiate offline scanning. For example, the processor 10 may send an instruction for initiating offline Bluetooth scanning to the sensor hub 12. Similar to the foregoing instruction for offline Bluetooth advertising, the instruction for offline Bluetooth scanning is used to instruct the processor 10 to go offline after the instruction is sent, to instruct the sensor hub 12 that the processor 10 is about to go offline, and to instruct the sensor hub 12 to start standard Bluetooth scanning or BLE scanning. After the processor 10 sends the instruction for offline Bluetooth scanning, at block 303, the processor 10 enters a sleep state. Bluetooth low energy scanning is used as an example for description below.

In a possible situation, before the processor 10 initiates the offline Bluetooth scanning, the Bluetooth protocol stack of the processor 10 has initiated scanning (block 301). The scanning may be Bluetooth scanning such as BLE scanning, that is, the Bluetooth communications module 14 may be performing or be about to perform Bluetooth scanning based on the instruction of the Bluetooth protocol stack of the processor 10. In this case, the sensor hub 12 does not need to instruct the Bluetooth communications module 14 again to initiate Bluetooth scanning. It may be understood that the content of block 301 may be used as a parameter in the instruction for offline Bluetooth scanning, or as a separate instruction sent to the sensor hub 12 along with the instruction for offline Bluetooth scanning, which is not limited herein. A method in which the sensor hub 12 can learn whether the Bluetooth protocol stack of the processor 10 has initiated scanning is not limited.

In this case, the Bluetooth application 121 of the sensor hub 12 generates a filter 143 based on the instruction for offline Bluetooth scanning from the processor 10, and registers the filter 143 of the sensor hub 12 with the Bluetooth communications module 14 by using the Bluetooth protocol stack 122 and the Bluetooth driver 123 (block 304). The filter 143 can filter out data not needed by the sensor hub 12 from the Bluetooth advertising data scanned by the Bluetooth communications module 14.

At block 305, the Bluetooth communications module 14 reports a scanning result conforming to the filter, for example, reports the scanning result conforming to the filter to the sensor hub 12, or for example, sends the same to the Bluetooth application 121.

As an example, after the Bluetooth communications module 14 receives an HCI (host controller interface) uplink data during scanning, the filter 143 filters the uplink data, and the filter 143 is configured with corresponding filtering parameters (rules) of the Bluetooth application. For example, the rules may include judging whether the uplink data is broadcast data or scanned data of the sensor hub 12, judging whether the uplink data is broadcast data or scanned data of the processor 10, and judging whether the uplink data is one or more of other types of data of the processor 10. Uplink data that does not conform to the rules is directly discarded at an internal logic layer of the Bluetooth communications module 14. Uplink data conforming to the rules is transmitted to the channel switching module 141. At the channel switching module 141, the controller 142 controls the channel switching module 141 to send the filtered data to the sensor hub 12 and/or the processor 10 based on an instruction of the filter 143.

In some embodiments, the Bluetooth communications module 14 can implement UART and I2C/I3C concurrency. For example, data conforming to the filter of the sensor hub 12 is sent to the sensor hub 12 by using the I2C/I3C, data conforming to the filter of the processor 10 is sent to the processor 10 by using the UART, and data conforming to both filters will be sent to the processor 10 and the sensor hub 12 concurrently by using the UART and the I2C/I3C.

In some examples, the internal logic layer may further include a filter list, and the filter list may store one or more filters of the processor 10 and one or more filters of the sensor hub 12. The filter of the processor 10 is generated in the processor 10 and transmitted to the internal logic layer of the Bluetooth communications module 14 by using the UART, and the filter of the processor 10 may be used for a Bluetooth scanning service of the processor 10 in a non-sleep state. Correspondingly, the filter of the sensor hub 12 in the filter list may be the filter generated in the sensor hub 12 as described above. Alternatively, the processor 10 and the sensor hub 12 use one filter, and the filter is configured with filter parameters for the processor 10 and the sensor hub 12, respectively.

Next, at block 306, the sensor hub 12 parses the reported scanning result and stores the parsed data. For example, if the scanning result is broadcast data, the Bluetooth application 121 parses data such as broadcast device address, broadcast access address and local name from the broadcast data. The parsed data may be stored in the sensor hub 12. It may be understood that the sensor hub 12 may include a volatile or non-volatile storage medium, such as a suitable dynamic random access memory (DRAM), a static random access memory (SRAM), or the like.

Then, at block 307, the sensor hub 12 can send a wake-up request to the processor 10 to wake up the processor 10 from the sleep state. After the processor 10 is woken up at block 308, at 309, the sensor hub 12 sends the parsed data, for example, the Bluetooth application 121 sends the parsed data to the processor 10. As an example, the processor 10 receives the parsed data by using the sensor driver 103, the data is uplinked and passes through the sensor HAL 102 and the sensor architecture 101 and reaches the application layer, and at the application layer, an application requesting for Bluetooth data may use the parsed data.

As another example, the time for sending the wake-up request may be determined by the sensor hub 12 based on preset conditions. For example, the sensor hub 12 may send a wake-up request after the capacity of the stored data reaches a predetermined size, such as 64 KB or 128 KB. In other examples, in some applications, such as device state synchronization, the sensor hub 12 can extract one or more specific types of data from the parsed data, judge the extracted data based on preset conditions, and wake up the processor 10 based on a result of judgment. The selection of specific types of data and the determining of preset conditions may be set separately based on different usage scenarios of the user equipment 1, which will be described accordingly in the example usage scenarios of the user equipment 1 below:

In some other embodiments, the sensor hub 12 may only store reported scanning results without further processing these scanning results.

In some other embodiments, the sensor hub 12 may not need to wake up the processor 10, and the sensor hub 12 may send the stored data to the processor 10 when the processor 10 requests for the data.

Figure 4:
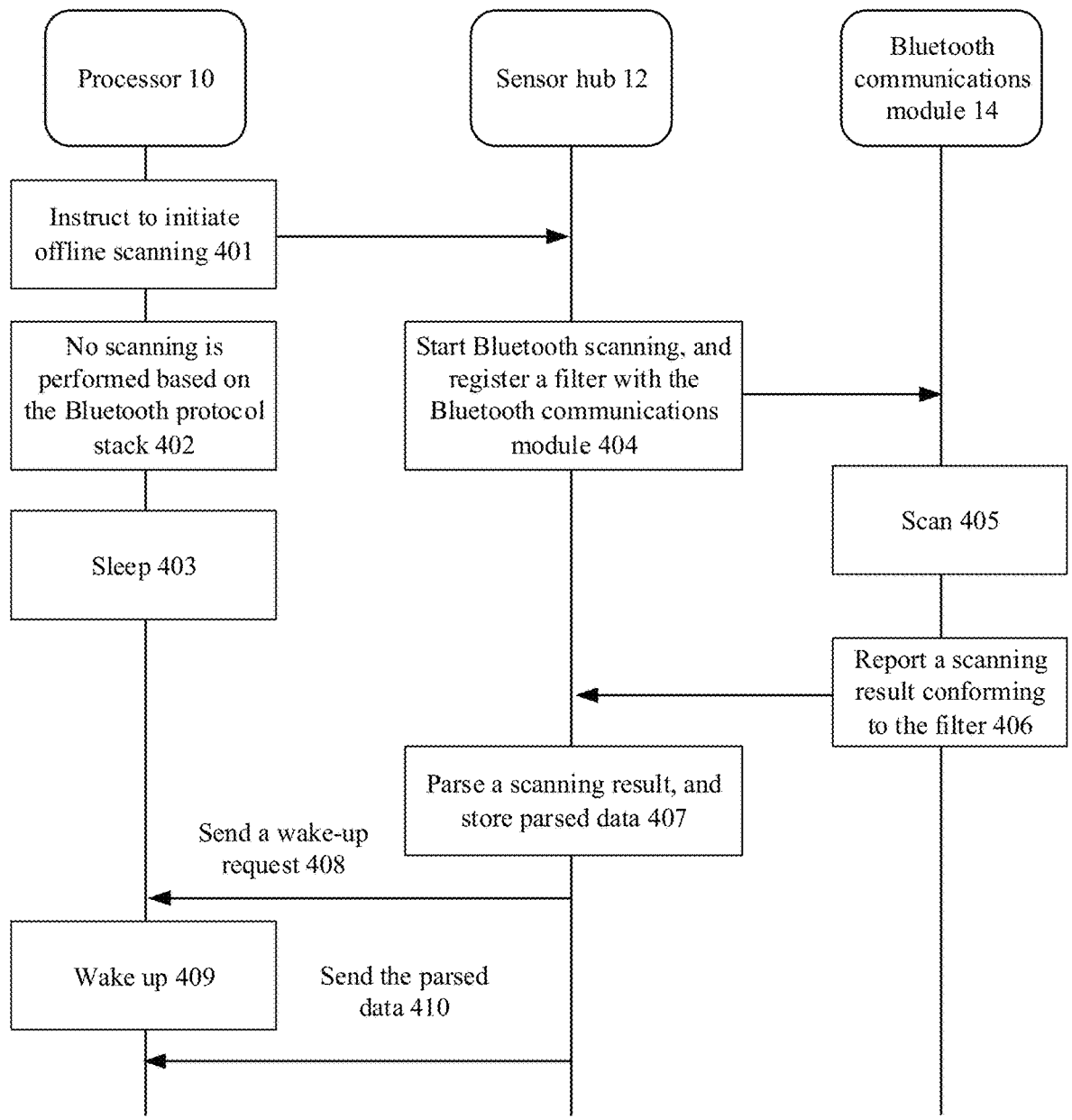
FIG. 4 is a schematic flowchart of Bluetooth scanning according to another embodiment.

FIG. 4 is a flowchart of another type of Bluetooth scanning according to an embodiment.

In FIG. 4, the blocks having the same functions as those shown in FIG. 3 are not described in detail herein again. Blocks or parts that are different from those in the example method 300 will be described in detail below:

At block 401, the processor 10 instructs to initiate offline scanning. For example, the processor 10 sends an instruction for starting offline Bluetooth scanning to the sensor hub 12. Different from the process shown in FIG. 3, at block 402, no Bluetooth scanning is performed based on the Bluetooth protocol stack of the processor 10. Therefore, at block 404, the sensor hub 12 needs to start, based on the instruction for initiating offline scanning from the processor 10, Bluetooth scanning and registers a filter with the Bluetooth communications module. For example, the Bluetooth application 121 starts Bluetooth scanning and registers a filter for scanning with the Bluetooth communications module 14.

Specifically, the Bluetooth application 121 starts, based on the instruction of the processor 10, the BLE scanning application and generates a corresponding filter 143. For the function of the filter 143, reference may be made to the foregoing description, and details are not described herein again. The Bluetooth protocol stack 122 sends an instruction to the Bluetooth driver 123 based on the Bluetooth scanning protocol, and the Bluetooth driver 123 generates a Bluetooth scanning drive instruction, and sends the Bluetooth scanning drive instruction and the filter 143 to the Bluetooth communications module 14 by using the I2C interface to drive the Bluetooth communications module 14 to start Bluetooth scanning (block 405).

As shown in FIG. 4, the contents described in block 406 to block 410 are similar to the contents of blocks 305 to block 309 shown in FIG. 3. Details are not described herein again.

The following briefly describes possible Bluetooth data interaction between the devices by using the example scenario of WLAN link establishment between the user equipment 1 and other devices as an example and referring to the BLE advertising and BLE scanning processes described in FIG. 2 to FIG. 4.

For example, a device A near the user equipment 1 sends a broadcast message M1 to the user equipment 1 for discovery by the user equipment 1. The broadcast message M1 of the device A may include a preamble, a message type and a current device ID. The preamble is used for filtering broadcast during BLE scanning, which improves the performance of broadcast processing, that is, the filter 143 filters out an unnecessary broadcast message based on the preamble of the broadcast message. The message type is used to distinguish between the types of different messages transmitted, and the current device ID is used to uniquely identify a sender's device.

After initiating a scan, the user equipment 1 receives the broadcast message M1 from the device A. After passing through the filter 143, the broadcast message is sent to the Bluetooth application 121. The Bluetooth application 121 finds that the user equipment 1 does not cache link establishment information of the device A. Therefore, the user equipment 1 sends a message M2 to the device A, to indicate that user equipment 1 wants to obtain the link establishment information of the device A.

The message M2 may include: a preamble, a message type, a current device ID, and a destination device ID. The destination device ID is used to identify a destination device to which the message is sent. A receiver device can use this destination device ID to match against its own device ID. If they are the same, it indicates that the receiver device can process the message. After receiving the message M2, the device A replies to the user equipment 1 with its own link establishment information.

The user equipment 1 receives link establishment information M3 sent by the device A. In addition to the preamble, the message type, the current device ID and the destination device ID, M3 may further include: an SSID, a key and an MAC address of link establishment of the device A. The Bluetooth application 121 of the user equipment 1 parses the SSID, key and MAC address of link establishment from the link establishment information M3, and caches the same in the sensor hub 12. When the user equipment 1 needs to establish a link for the device A subsequently, the processor 10 can obtain the parsed information from the Bluetooth application 121 of the sensor hub 12 by using the sensor driver 103, thereby quickly completing link establishment.

In this embodiment, because the sensor architecture 101, the sensor HAL 102 and the sensor driver 103 are added to the processor 10 of the user equipment 1, and the modules for processing Bluetooth communication, such as the Bluetooth application 121, the Bluetooth protocol stack 122 and the Bluetooth driver 123, are added to the sensor hub 12, the Bluetooth communication function that can only be implemented on the processor 10 side in the prior art can be additionally implemented in the sensor hub 12, for example, in the Bluetooth communication processes described in FIG. 2 to FIG. 4. Based on this, the user equipment 1 can perform BLE advertising and/or BLE scanning on the sensor hub 12 side when the processor 10 sleeps, to implement functions such as device discovery, subsequent obtaining of device link establishment information, device state synchronization for other user equipment, and therefore power consumption of the device can be effectively reduced.

In addition, because some functions of Bluetooth communication can be implemented in the sensor hub 12, it is possible for the sensor hub 12 to implement Bluetooth device discovery with low energy always enabled, and the sensor hub 12 can further store Bluetooth communication data parsed by the Bluetooth application 121. Therefore, the user equipment 1 can further increase the speeds of device discovery, device link establishment and data synchronization in the Bluetooth communication process. In addition, in one or more embodiments, when the user uses the user equipment, the increase in the speeds can be perceived, thereby optimizing user experience. The following further refers to specific usage scenarios to describe the technical effects of increasing the Bluetooth communication speed.

FIG. 2 to FIG. 4 provide exemplary descriptions of the Bluetooth communication process according to the embodiments, and are not intended to limit the scope of this disclosure. For example, the embodiments may be applied to the scenario of the example in which the processor 10 sleeps as described above, which is not a specific limitation to the application scenario of the solution, and will not be described in subsequent contents. As an example, the embodiments may be further applied to a scenario where a load of the processor 10 is high or full. In this scenario, when wireless communication such as Bluetooth occurs, the processor 10 may instruct the sensor hub 12 to perform wireless communication processing. For example, when the load of the processor 10 is high, the processor 10 instructs the sensor hub 12 that the current load of the processor 10 is high, and instructs the processor 10 to initiate services such as Bluetooth advertising and/or Bluetooth scanning, to share a wireless communication service for the processor 10, and alleviate a situation of the high service load of the processor 10.

It may be understood that instructions sent by the processor 10 to the sensor hub 12 may be different in different application scenarios. For example, in some scenarios, the processor 10 may send instructions for starting Bluetooth advertising and/or scanning instead of instructions for offline Bluetooth advertising and/or scanning. The following further describes the technical effects with reference to various application scenarios of the embodiments.

Figure 5A:
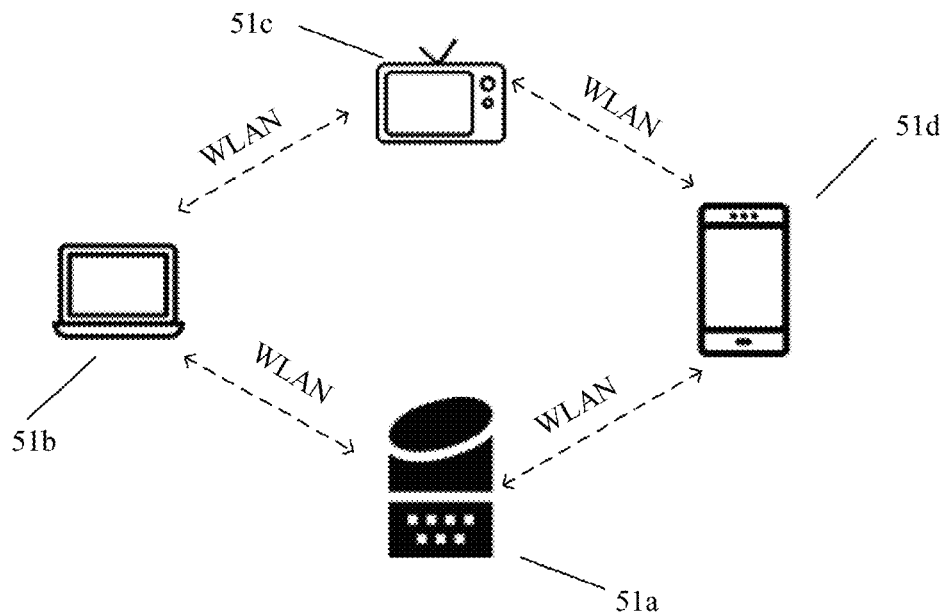
FIG. 5a to FIG. 5c are schematic diagrams of usage scenarios of user equipment according to an embodiment.
Figure 5B:
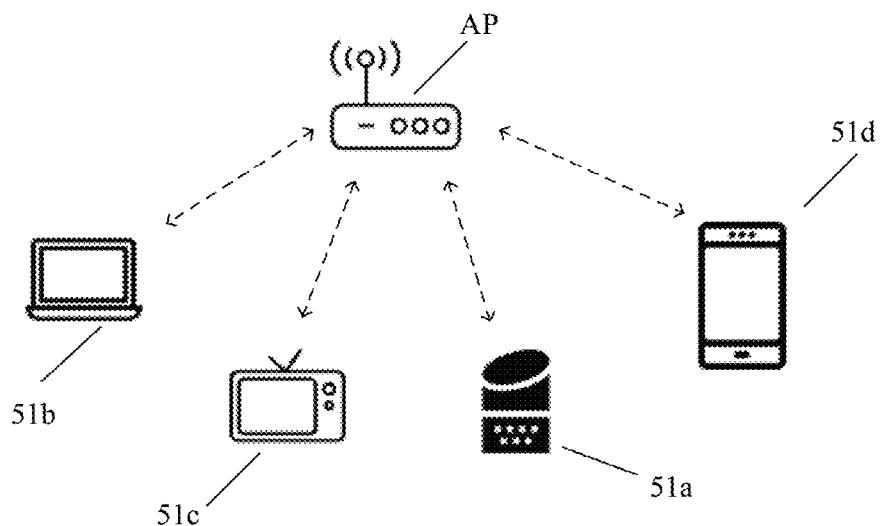
Figure 5C:
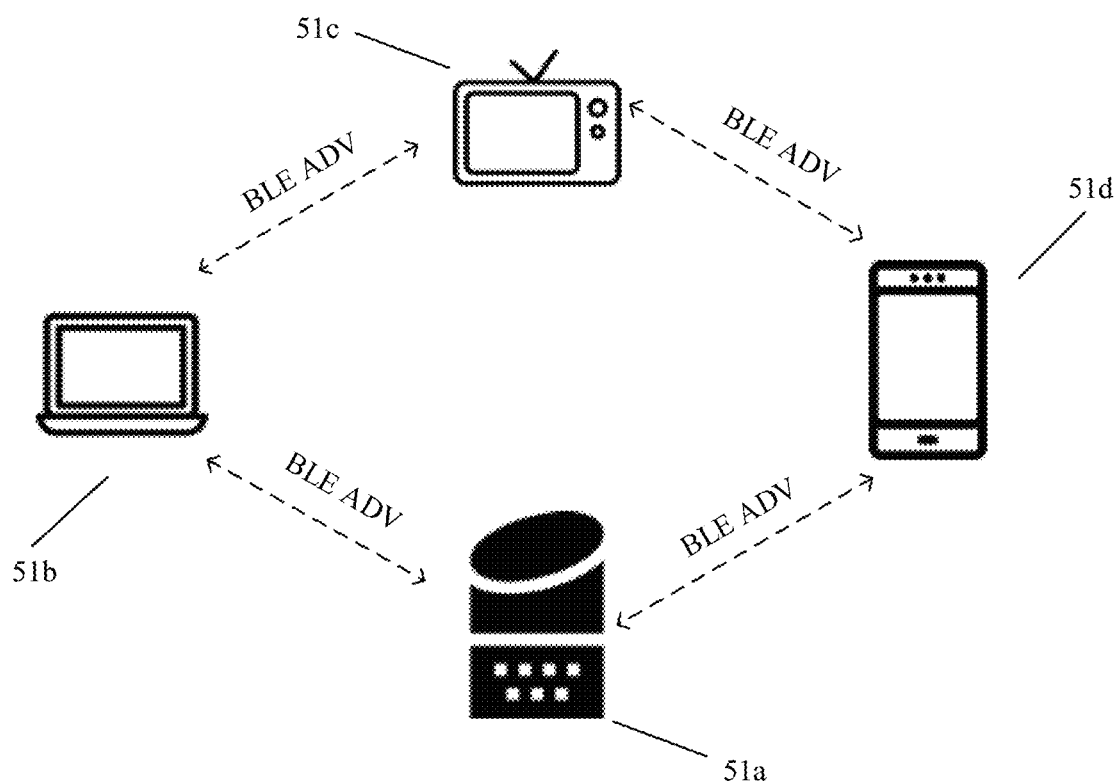

FIG. 5a to FIG. 5c show example usage scenarios of user equipment according to embodiments.

In the scenario shown in FIG. 5, at least one of user equipment 51a to 51d may be the user equipment 1 shown in FIG. 1. In FIG. 5a to FIG. 5c and the rest of the accompanying drawings, a letter after the reference number, such as "51a", indicates a reference to an element with the specific reference number. A reference number without a subsequent letter in the text, such as "51", indicates a general reference to the embodiment of the element with the reference number. In the scenario of FIG. 5, for example, the user equipment 51a may be a Bluetooth speaker, the user equipment 51b may be a notebook computer, the user equipment 51c may be a smart TV, and the user equipment 51d may be a smart phone.

FIG. 5a shows an example scenario in which the user equipment is networked through WLAN multi-hop. For example, each piece of user equipment 51 uses a wireless MESH technology for networking. FIG. 5b shows an example scenario in which the user equipment 51 is networked by using the same wireless AP (access point). In addition, FIG. 5c shows an example scenario in which the user equipment 51 is networked through Bluetooth low energy (BLE/BTLE) advertising. The foregoing scenarios only schematically list common application scenarios of user equipment. For example, the foregoing scenarios may be smart home interconnection scenarios of users.

For simplicity of description, using the user equipment 51a and 51b as the user equipment described in the foregoing embodiment as an example, the scenario in which a plurality of pieces of user equipment are interconnected as shown in FIG. 5 is described below. In the following description, the user equipment 51a and 51b are within the wireless communication range, which will not be described subsequently.

The networking process of the user equipment 51a and 51b is described with reference to FIG. 6. To further illustrate the technical effects, networking processes of the prior art and this disclosure are compared in FIG. 6. It may be understood that the networking process in the prior art is only used as an example of a usual networking process, and is used only as a reference example for describing the technical solution, will not be described in detail, and will be mentioned only when necessary. For the content not described in the foregoing device and method embodiments, reference may be made to the following process embodiment. Similarly, for the content not described in the process embodiment, reference may be made to the foregoing device and method embodiments.

In addition, for the specific communication process of the user equipment 51a and 51b, reference may be made to the description of the foregoing embodiment, and similar parts are not described in detail herein. In the following description, the user equipment 51 is used as a master device and the user equipment 51b is used as a slave device. This limitation is only for convenience of description and understanding of the embodiment, and is not a specific limitation on the scope of this disclosure.

Figure 6A:
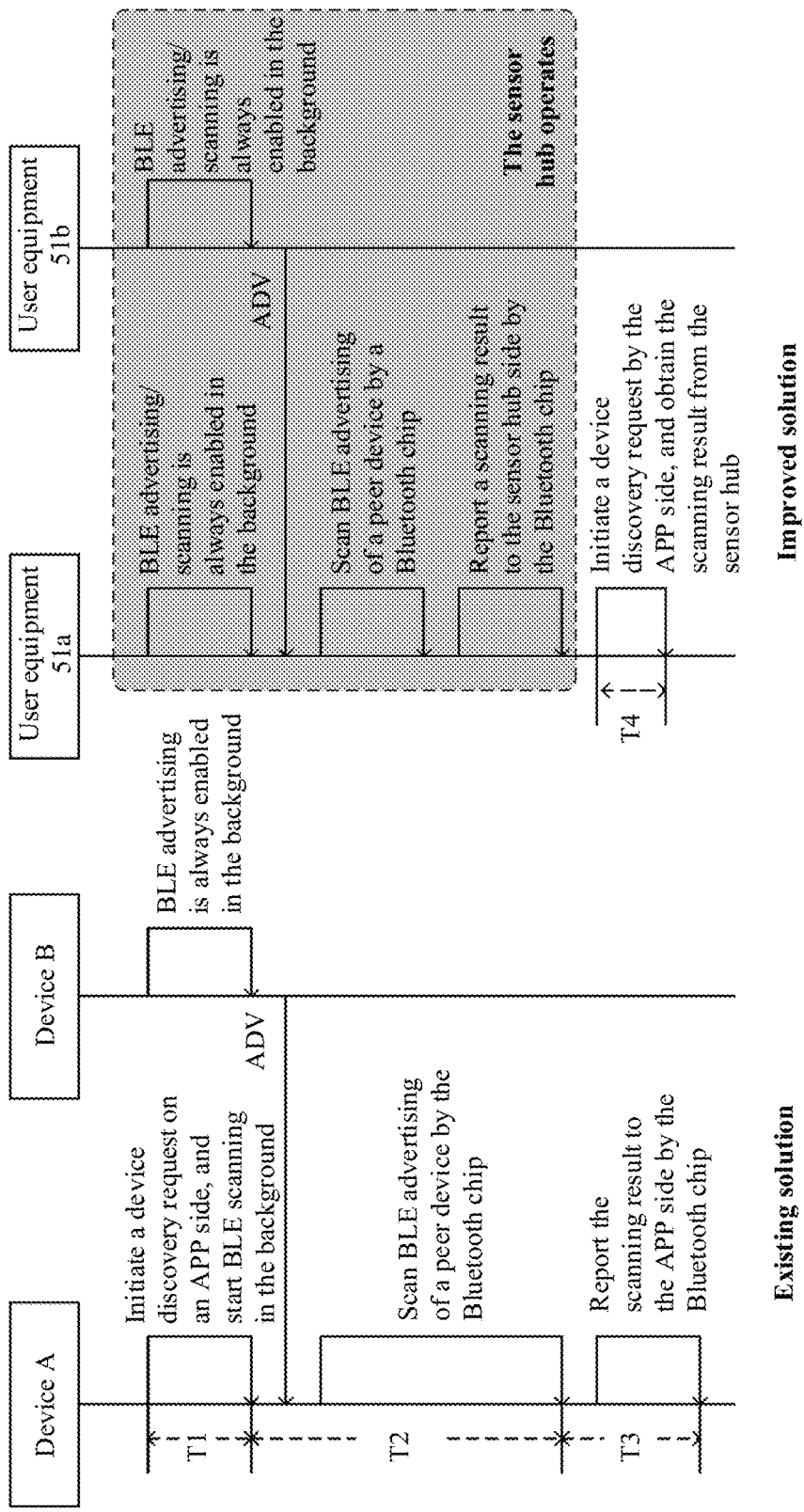
FIG. 6a to FIG. 6c are schematic diagrams of an improved interaction flow in a scenario of user equipment according to an embodiment.

FIG. 6a shows a process of quick discovery of a plurality of pieces of user equipment in the foregoing scenario. As shown in FIG. 6a, in the prior art, the time required for the device A and a device B to discover each other is T1+T2+T3. Specifically, when the device A and the device B are within the discoverable range, the application layer of the processor of the device A initiates a device discovery request, and finally the Bluetooth communications module initiates BLE scanning. The time required from the service side of the device A initiating the request to the Bluetooth communications module initiating the scanning is T1. The Bluetooth communications module of the device A receives the BLE advertising sent by the device B, and the time required for receiving the advertising is T2. The Bluetooth communications module of the device A reports the advertising packet to the application layer of the processor by using the Bluetooth protocol stack, and the time required for reporting the advertising packet is T3.

In this embodiment, when the user equipment 51a and the user equipment 51b are within the discoverable range, the user equipment 51b periodically initiates BLE advertising in the background, and the sensor hub of the user equipment 51a and/or the sensor hub of the user equipment 51b are/is processing Bluetooth communication. Before the application layer of the processor of the user equipment 51a initiates the device discovery request, for example, when the user equipment 51a is sleeping, the user equipment 51a keeps BLE scanning always enabled with a lower duty cycle in the background by using the sensor hub, and starts BLE advertising. The Bluetooth communications module of the user equipment 51a receives the BLE advertising sent by the user equipment 51b. The Bluetooth communications module of the user equipment 51a reports the adverting packet to the sensor hub, which does not affect the dormancy of the processor of the user equipment 51a. When the application layer of the processor of the user equipment 51a initiates a device discovery request, the processor can read the previously obtained BLE advertising of the user equipment 51b from the sensor hub, and the time required to obtain the advertising packet is T4. In this embodiment, it can be determined that the time for device discovery is T4, and T4 is less than T3 and much less than T1+T2+T3.

As shown in FIG. 6a, if in an existing solution, it is required to discover a device, that is, to obtain a device list, it is required to send a BLE scanning to the Bluetooth communications module, and then wait for the Bluetooth communications module's scanning the BLE adverting initiated by a peer device, and finally report the BLE adverting information to the application layer of the processor, and the application layer parses the BLE adverting and then obtains the device list.

On the contrary, in this embodiment, device discovery with low energy always enabled is implemented by using the sensor hub, and data is cached to the sensor hub. When there is a service requirement on the processor side, the sensor architecture 101, the sensor HAL 102, and the sensor driver 103 and other modules are used to directly obtain the device list cached in the sensor hub, thereby implementing quick discovery between devices. This greatly increases the response speed of presenting the device list on the user equipment for the user.

Figure 6B:
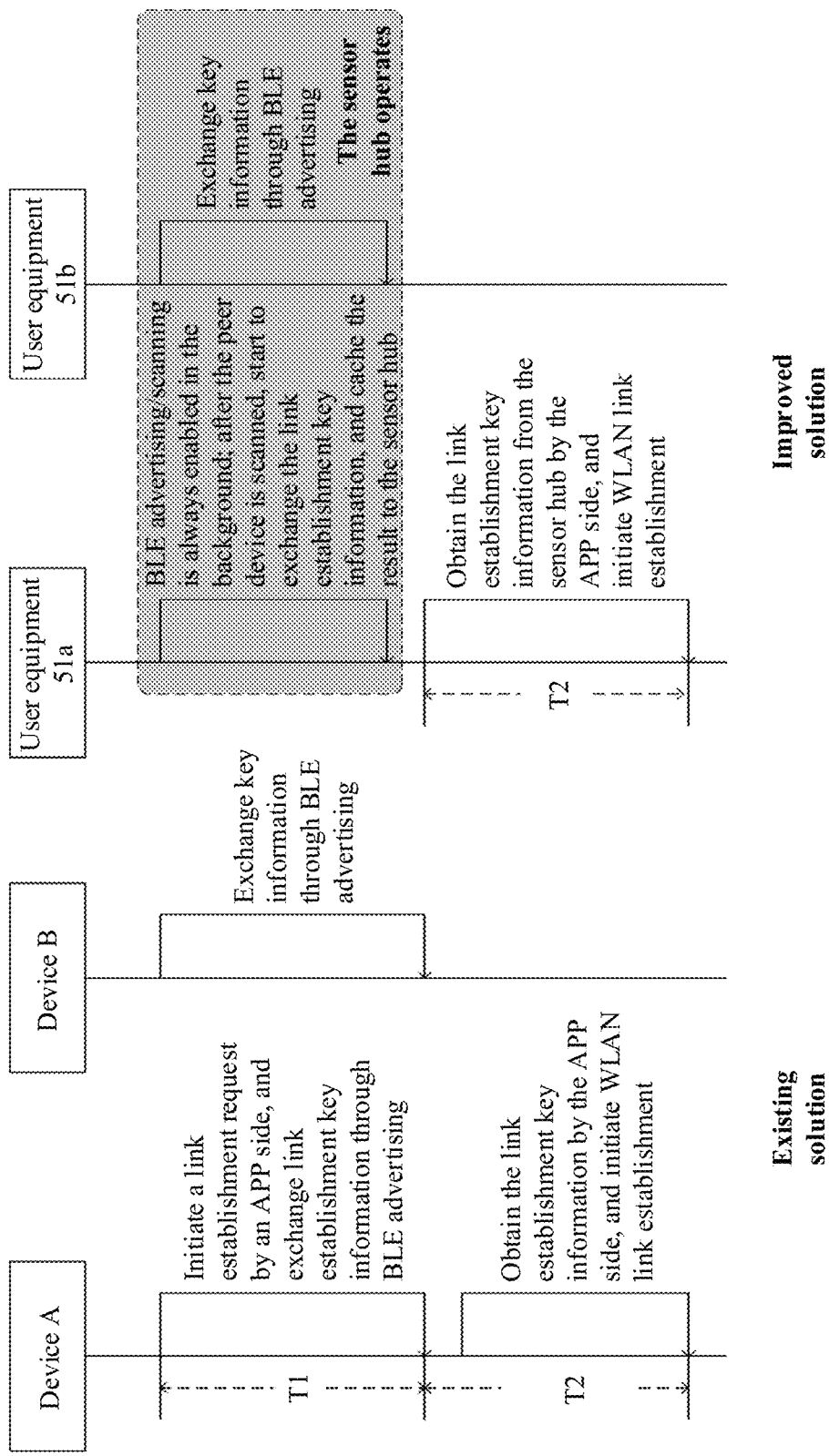

The following describes the WLAN link establishment process between devices in FIG. 5a with reference to FIG. 6b. The WLAN link establishment process involves the synchronization of key information. As shown in FIG. 6b, in the prior art, the time required for the device A and the device B to complete WLAN link establishment is T1+T2. Specifically, after the device A and the device B discover each other, the device A initiates a link establishment request, and the device A and the device B exchange link establishment key information through BLE advertising. The time required to exchange keys through BLE advertising is T1. Then, after obtaining the key information, the device A and device B initiate WLAN link establishment, and the time required for WLAN link establishment is T2.

In an embodiment, after the user equipment 51a and the user equipment 51b discover each other, the user equipment 51a and/or the user equipment 51b exchange key information for link establishment by using the sensor hubs in the background. When the application layer of the processor of the user equipment 51a initiates a link establishment request, the processor can read the previously cached key information from the sensor hub. After the user equipment 51a obtains the key information, the user equipment 51a and the user equipment 51b initiate WLAN link establishment, and the time required for WLAN link establishment is T2. In this embodiment, it can be determined that the time for WLAN link establishment between devices is T2, and T2 is less than T1+T2.

As shown in FIG. 6b, in this embodiment, link establishment information interaction with low energy always enabled is implemented by using the sensor hub, and WLAN link establishment information is cached to the sensor hub. When there is a device link establishment requirement on the processor side, the sensor architecture 101, the sensor HAL 102, and the sensor driver 103 and other modules are used to directly obtain the WLAN link establishment information at the sensor hub, thereby implementing quick device link establishment. For the user, when the user needs to wirelessly transmit relatively large data between devices, for example, by using an application of fast data transmission, the technical solution enables the user to initiate data transmission after he/she selects the destination device to which data is transmitted, thereby effectively improving user experience.

Figure 6C:
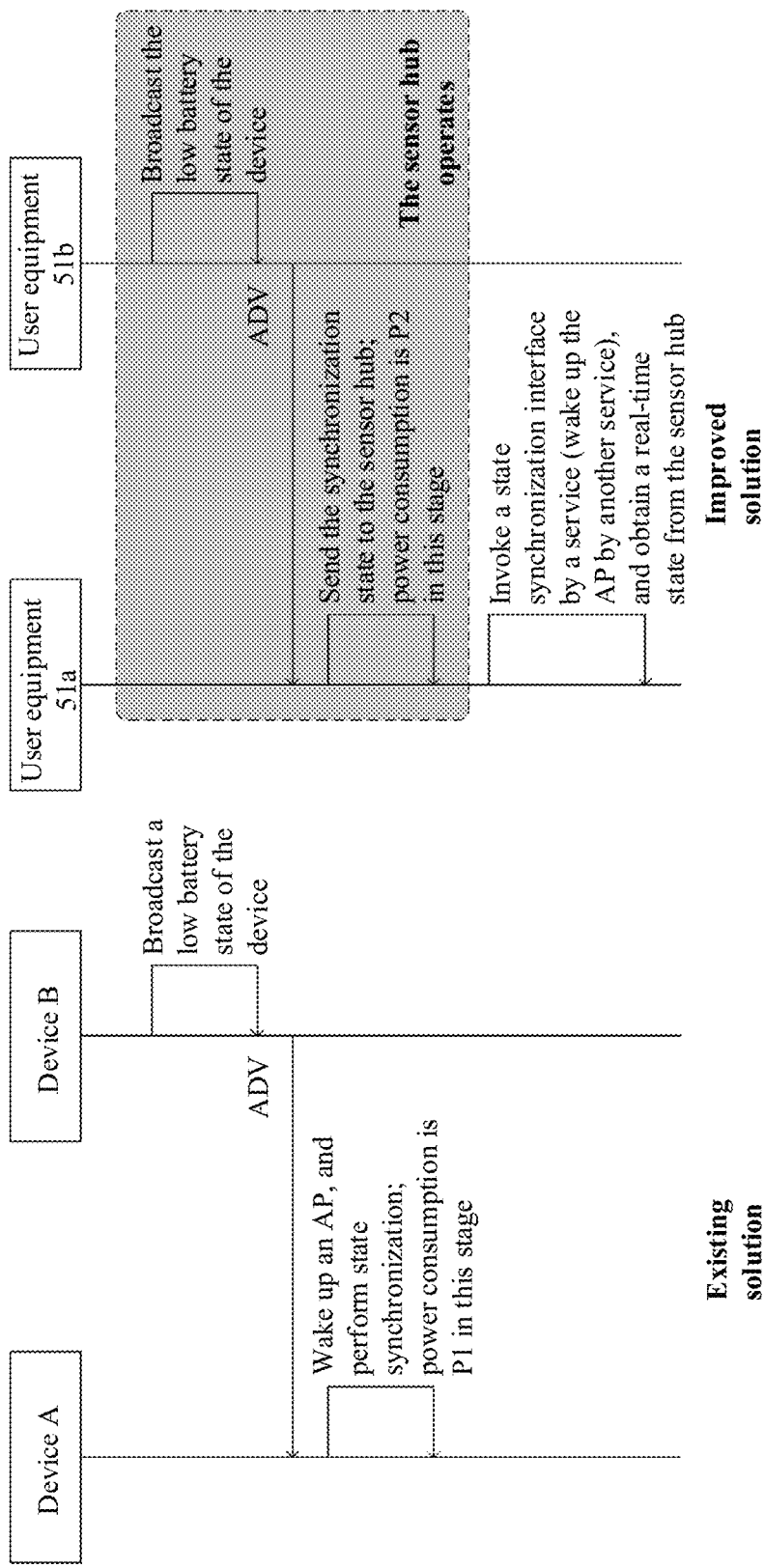

Possible data synchronization between various devices in the scenario shown in FIG. 5 is described with reference to FIG. 6c. Data synchronization between devices may include, for example, synchronization of cryptographic information involved in FIG. 6b and synchronization of various device states of various devices. FIG. 6c shows a state synchronization process by using a device with a low battery as an example.

As shown in FIG. 6c, it is assumed that the device B and the user equipment 51b are low battery devices. In the prior art, after the device A and the device B are successfully networked, the device A sleeps, and the device B has a low battery. The device B broadcasts the low battery state of the device through BLE, and the Bluetooth communications module of the device A receives the low battery state broadcast by the device B and wakes up the processor of the device A to update the device state. It is assumed that power consumption of processor wake-up and state synchronization is P1.

In this embodiment, after receiving the low battery state of the user equipment 51b, the Bluetooth communications module of the user equipment 51a sends the state to the sensor hub. The sensor hub can synchronize the device state. It is assumed that the power consumption for the sensor hub to synchronize the device state is P2. The device state may be saved in the sensor hub. As an example, when the processor of the user equipment 51a is woken up by other applications, the processor may obtain the saved low battery state of the user equipment 51b from the sensor hub. Therefore, in this example, the power consumption for state synchronization is only P2. Under the same actual test conditions, the power consumption increment value corresponding to P1 is about 8.28 mA, and the power consumption increment value of the sensor hub corresponding to P2 is about 0.001 mA.

It can be learned that in this embodiment, the sensor hub is used to achieve state synchronization with low energy always enabled, which can significantly reduce the power consumption of the user equipment.

In some other embodiments, the sensor hub of the user equipment 51a may determine based on the low battery state of the user equipment 51b whether to actively wake up the processor of the user equipment 51a. As an example, when the low battery state indicates that the remaining power (for example, the remaining power is 15%) is lower than a preset threshold (for example, the preset threshold is 20%), the sensor hub actively wakes up the processor and reports the low battery state. The preset threshold can be configured by the sensor hub, or configured by the processor and then sent to the sensor hub for storage. The sensor hub can determine whether specific data reaches the preset threshold when parsing data reported by other devices, such as low battery state data.

In this disclosure, data synchronization is not limited to the foregoing low battery state synchronization.

In some embodiments, in the networking scenario shown in FIG. 5, and other scenarios not mentioned in the specification, the user equipment in the foregoing embodiments may further synchronize other state data for different applications. For example, in a situation in which various networking devices work cooperatively, for example, in a situation of distributed computing, all the equipment may need to synchronize data such as the load state of the processor, the device battery state, and running applications of the devices.

As an example, when the user equipment needs distributed computing resources, before the user equipment distributes computing tasks to other devices in the network, the user equipment may need to judge based on the synchronization states of other devices whether other devices can perform computing tasks. For example, the user equipment may exclude devices with low battery and/or devices running specific applications, and the specific applications may include, for example, call applications and high-load applications such as game applications. When the devices run these applications, if computing tasks are distributed to the devices, the running applications may be obviously adversely affected.

Therefore, in scenarios where the user equipment needs to perform distributed computing, the foregoing various state data can be synchronized in the sensor hub of the user equipment, and the processor of the user equipment can obtain synchronization data of other devices from the sensor hub before distributing computing tasks. In some other examples, based on the change of the synchronized state data, the sensor hub may further determine whether to wake up the processor and report the state data. For example, in distributed computing, if the processor load of other devices changes greatly, for example, changes from the low load to the high load in a short time, or vice versa, against the jump of the state data, the sensor hub can directly wake up the dormant processor and report the state information.

According to some other embodiments, in the scenario shown in FIG. 5, when the user equipment 51a is sleeping and the user equipment 51b has a poor network state or is off-network, the user equipment 51a may further perform quick state synchronization by using the sensor hub.

For example, because the user equipment 51a cannot scan the BLE advertising sent by the user equipment 51b, a timeout mechanism is triggered after a period of time, and the sensor hub of the user equipment 51a deletes the user equipment 51b from the device list and caches the device list. When needing to synchronize a scan list, the processor of the user equipment 51a can directly obtain the real-time scan list from the sensor hub. On the contrary, in the prior art, in the foregoing situation, the user equipment needs to rescan the device before synchronizing the device list, and then update the device list.

In some other embodiments, in the foregoing various data synchronization situations, when the data needing to be synchronized is relatively large, for example, when the data exceeds the maximum quantity of bytes, 62 bytes, that can be carried by BLE advertising, BLE links may be used between user equipment to transmit synchronization data. The foregoing is only a schematic example. In various embodiments, a transmission method of data synchronization is not limited.

Referring back to FIG. 5, with reference to the description of the possible process shown in FIG. 6, in each scenario of FIG. 5, the user basically does not need to wait when starting a wireless connection.

In a possible application scenario, for example, the user dictates an instruction "I want to watch the movie Transformers 4" to the user equipment 51a (smart speaker). Because the user equipment 51a has completed quick discovery, quick networking and low energy quick state synchronization between devices, the user equipment 51a directly reads properties and states corresponding to the devices in the whole network from the sensor hub, and finds that the user equipment 51c (smart TV) is suitable for playing movies, then the user equipment 51a sends an instruction for playing Transformers 4 to the user equipment 51c, and the user equipment 51c starts playing the movie. Therefore, in this scenario, within a short time after the user gives the instruction, the target device can respond to the user's instruction to perform the corresponding task.

In an example scenario, in the prior art, scanning and synchronization of device properties and state are usually initiated only when a service comes. The user needs to wait for a certain period of time before obtaining a response from the device, which cannot meet the user's requirements for the device.

On the contrary, based on the user equipment, after networking, the synchronization of device properties and state is completed in real time without waking up AP, which not only has better performance and lower power consumption, but also greatly improves user experience.

In the example descriptions of FIG. 5 and FIG. 6, although two pieces of user equipment with the functions described in this embodiment are used as examples for description, it is understandable that even only one piece of user equipment with the functions described in this embodiment is used in various scenarios mentioned or not mentioned in this disclosure, the user equipment can also improve user experience.

From the perspective of practicability, the following briefly describes examples of power consumption reduction of user equipment in various embodiments.

Under the conditions of a scanning duty ratio of 10% (2.3 mA) and a broadcasting cycle of 1 s, data is measured based on Huawei Mate 20 Pro mobile phone+battery+power consumption meter. In the test time of 10 minutes, one broadcast is received every 6 s on the average, and the average time for waking up the processor by the broadcast is 3.5 s. Based on a difference in the quantity of devices performing Bluetooth communication with a test mobile phone and a change in the time interval of receiving broadcasts, power consumption of the processor in processing Bluetooth communication is about 8 mA to 24.5 mA. For example, when the test mobile phone scans broadcasts of only one mobile phone every 6 s, the power consumption of the processor in processing Bluetooth communication is 8.28 mA; when the test mobile phone scans broadcasts of two mobile phones every 6 s on average, the power consumption of the processor in processing the Bluetooth communication is 14.47 mA; and when the test mobile phone receives a broadcast every 1s on average, the power consumption of the processor in processing the Bluetooth communication is 24.35 mA.

Using the test mobile phone scanning broadcasts of only one mobile phone every 6 s as an example, the operating voltage of the sensor hub is 0.75 V, and the operating current is: 11 mA. The battery voltage is 3.8 V, the transmission loss rate is 0.58 (empirical value), and based on the following formula:

$$\text{Battery terminal current of a sensor hub} = \frac{\text{Operating voltage of the sensor hub} \times \text{Operating current of the sensor hub}}{\text{Battery voltage} \times \text{Transmission loss rate}}$$

the battery terminal current of the sensor hub may be obtained: 3.74 mA.

Under the foregoing actual measurement conditions, the sensor hub processes broadcast data once for about 2 ms, and processes broadcasts for 100 times in 10 minutes. The power consumption in processing Bluetooth communication is approximately: 3.74×(0.002×100/600)=0.001 mA. If DDR (double data rate) storage space is used and the DDR operating current is 49 mA, the DDR incremental power consumption is approximately: 49×3.74×(0.002×100/600) =0.016 mA. The total power consumption of the sensor hub and DDR storage accounts for only one-eight thousandths of the processor's power consumption of 8.28 mA on average. Therefore, it may be understood that the user equipment according to the technical solution can significantly reduce power consumption in Bluetooth communication.

Figure 7:
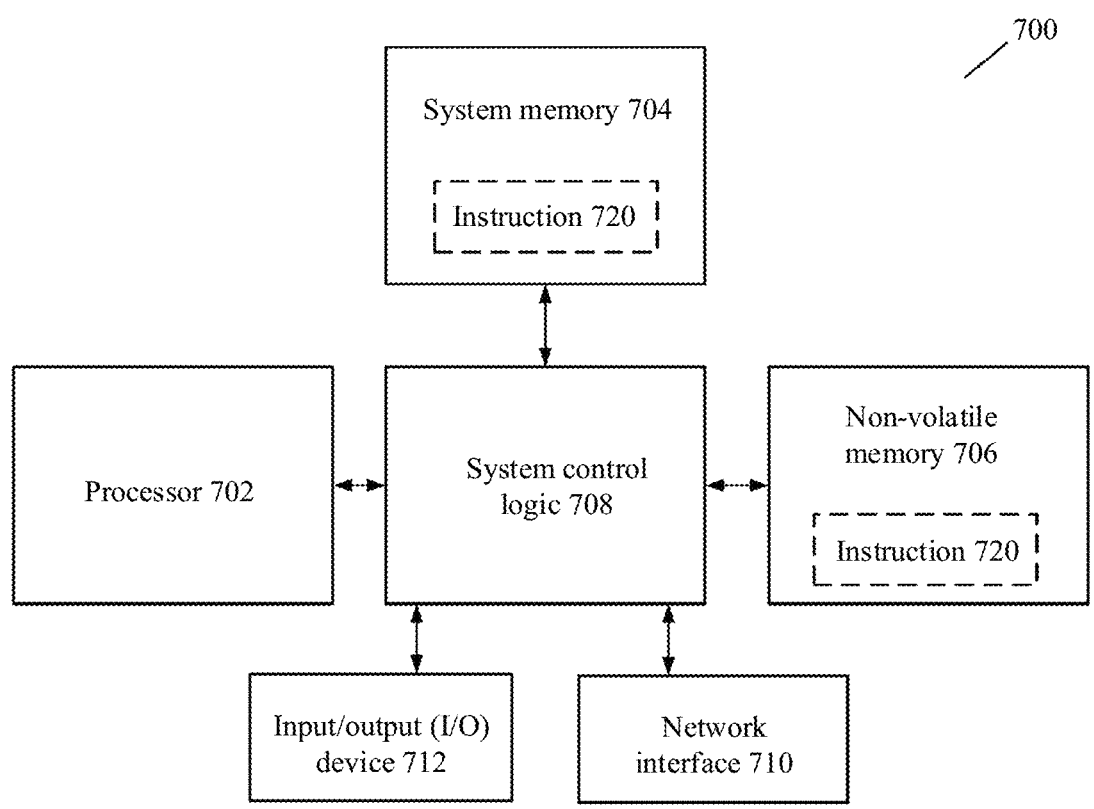
FIG. 7 is a schematic diagram of modules of a communications device according to an embodiment.

FIG. 7 is a block diagram of a communications device 700 according to an embodiment. The device 700 may include one or more processors 702, system control logic 708 connected to at least one of the processors 702, a system memory 704 connected to the system control logic 708, a non-volatile memory (NVM) 706 connected to the system control logic 708, and a network interface 710 connected to the system control logic 708.

The processor 702 may include one or more single-core or multi-core processors. The processor 702 may include any combination of a general-purpose processor and a specific processor (for example, a graphics processor, an application processor or a baseband processor). In the embodiments herein, the processor 702 may be configured to implement one or more of various embodiments shown in FIG. 2 to FIG. 4.

In some embodiments, the system control logic 708 may include any suitable interface controller to provide any suitable interface to at least one of the processors 702 and/or any suitable device or component in communication with the system control logic 708.

In some embodiments, the system control logic 708 may include one or more memory controllers to provide an interface connected to the system memory 704. The system memory 704 may be configured to load and store data and/or instructions. In some embodiments, the memory 704 of the device 700 may include any suitable volatile memory, such as a suitable dynamic random access memory (DRAM).

The NVM/memory 706 may include one or more tangible and non-transitory computer readable media for storing data and/or instructions. In some embodiments, the NVM/memory 706 may include any suitable non-volatile memory such as a flash memory and/or any suitable non-volatile storage device, for example, at least one of an HDD (hard disk drive), a CD (compact disc) drive, a DVD (digital versatile disc) drive.

The NVM/memory 706 may include some storage resources installed on an apparatus of the device 700, or may be accessed by the device, but is not necessarily a part of the device. For example, the NVM/memory 706 may be accessed over a network by using the network interface 710.

Particularly, the system memory 704 and the NVM/memory 706 may include a temporary copy and a permanent copy of an instruction 720, respectively. The instruction 720 may include an instruction that, when executed by at least one of the processors 702, enables the device 700 to implement the methods shown in FIG. 2 to FIG. 5. In some embodiments, the instruction 720, hardware, firmware and/or software components thereof may additionally/alternatively be placed in the system control logic 708, the network interface 710 and/or the processor 702.

The network interface 710 may include a transceiver configured to provide a radio interface to the device 700 to communicate with any other suitable device (such as a front-end module or an antenna) by using one or more networks. In some embodiments, the network interface 710 may be integrated on another component of the device 700. For example, the network interface 710 may be integrated on at least one of the processor 702, the system memory 704, the NVM/memory 706, and a firmware device (not shown) with instructions. When at least one of the processors 702 executes the instructions, the device 700 implements one or more of the various embodiments shown in FIG. 2 to FIG. 4.

The network interface 710 may further include any suitable hardware and/or firmware to provide a multi-input multi-output radio interface. For example, the network interface 710 may be a network adapter, a wireless network adapter, a telephone modem, and/or a wireless modem.

In an embodiment, at least one of the processors 702 may be packaged with logic of one or more controllers for the system control logic 708 to form a system in a package (SiP). In an embodiment, at least one of the processors 702 may be integrated on the same die with the logic of one or more controllers for the system control logic 708 to form a system on chip (SoC).

The device 700 may further include: an input/output (I/O) device 712. The I/O device 712 may include a user interface to enable the user to interact with the device 700; and the design of a peripheral component interface enables a peripheral component to also interact with the device 700. In some embodiments, the device 700 further includes a sensor, configured to determine at least one of an environmental condition and location information related to the device 700.

In some embodiments, the user interface may include, but is not limited to, a display (for example, a liquid crystal display or a touch screen display), a speaker, a microphone, one or more cameras (for example, a still-picture camera and/or a video camera), a flashlight (for example, a light-emitting diode flash) and a key board.

In some embodiments, the peripheral component interface may include, but is not limited to, a non-volatile memory port, an audio jack, and a power interface.

In some embodiments, the sensor may include, but is not limited to, a gyro sensor, an accelerometer, a proximity sensor, an ambient light sensor and a positioning unit. The positioning unit may alternatively be a part of the network interface 710 or interact with the network interface 710 to communicate with components (for example, global positioning system (GPS) satellites) of a positioning network.

Embodiments of the method disclosed herein may be implemented by using software, magnetic components, firmware, or the like.

Program code may be applied to input instructions to perform the functions described herein and generate output information. The output information may be applied to one or more output devices in a known manner. For the purposes of this disclosure, a processing system includes any system having a processor such as a digital signal processor (DSP), a microcontroller, an application-specific integrated circuit (ASIC), or a microprocessor.

The program code may be implemented in a high-level programming language or an object-oriented programming language to communicate with the processing system. When necessary, an assembly language or machine language may also be used to implement the program code. In fact, the mechanism described herein is not limited to the scope of any particular programming language. In any case, the language may be a compiled language or an interpreted language.

One or more aspects of at least one embodiment may be implemented by representative instructions stored on a computer readable storage medium. The instructions represent various logic in a processor, and the instructions, when read by a machine, enable the machine to manufacture logic for executing the techniques described herein. These representations, referred to as "IP cores", may be stored on a tangible computer readable storage medium and provided to a plurality of customers or production facilities to be loaded into a manufacturing machine that actually manufactures the logic or the processor.

In some cases, an instruction converter may be used to convert instructions from a source instruction set to a target instruction set. For example, the instruction converter can transform (for example, by using static binary conversion, or dynamic binary conversion including dynamic compilation), deform, simulate or convert in other manners the instructions into one or more other instructions to be processed by a core. The instruction converter may be implemented by software, hardware, firmware, or a combination thereof. The instruction converter may be on the processor, outside the processor, or partly on the processor and partly outside the processor.

The foregoing descriptions are merely specific embodiments of the present invention, and the protection scope of the present invention is not limited thereto. Various equivalent modifications or replacements readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless communication method, applied to a coprocessor of an electronic device, wherein the method comprises:
   receiving an instruction from a processor of the electronic device for instructing the coprocessor to perform a wireless communication service;
   in response to the instruction from the processor, initiating the wireless communication service, and generating a drive instruction for driving a wireless communications device of the electronic device to perform wireless communication of the wireless communication service; and
   sending the drive instruction to the wireless communications device;
   wherein the coprocessor is a sensor hub configured at least partially to process sensor data from one or more sensors of the electronic device.

2. The method according to claim 1, wherein the instruction from the processor further comprises information that the processor is about to sleep or that a load of the processor is high.

3. The method according to claim 1, wherein the method further comprises:
   receiving, from the wireless communications device, data of the wireless communication service obtained during the wireless communication.

4. The method according to claim 3, wherein the method further comprises:
   generating a data filter based on the wireless communication service; and
   sending the data filter to the wireless communications device, wherein the data filter is configured at least partially to instruct the wireless communications device to send the data to at least one of the processor or the coprocessor.

5. The method according to claim 3, wherein the method further comprises:
   storing the data in the coprocessor; or
   parsing the data based on the wireless communication service to generate parsed data, and storing the parsed data in the coprocessor.

6. The method according to claim 5, wherein the method further comprises:
   sending the data or the parsed data stored in the coprocessor to the processor in response to a request from the processor.

7. The method according to claim 1,
   wherein the wireless communication service comprises at least one of wireless broadcasting, wireless scanning, or wireless data synchronization; and
   wherein the wireless communication comprises at least one of Bluetooth communication or Bluetooth low energy communication.

8. An electronic device, wherein the electronic device comprises:
   a processor;
   a coprocessor, wherein the coprocessor is a sensor hub configured at least partially to process sensor data from one or more sensors of the electronic device; and
   a wireless communications device, wherein the wireless communications device is coupled to the processor and the coprocessor in a communicating manner;
   wherein the processor is configured to send an instruction to the coprocessor, wherein the instruction is used to instruct the coprocessor to perform a wireless communication service;
   wherein the coprocessor is configured to, based on the instruction from the processor, initiate the wireless communication service, and generate a drive instruction for driving the wireless communications device to perform wireless communication of the wireless communication service; and
   wherein the wireless communications device is configured to receive the drive instruction from the coprocessor, and perform the wireless communication based on the drive instruction.

9. The electronic device according to claim 8, wherein the processor is further configured to send the instruction before the processor sleeps, and the instruction further comprises information that the processor is about to sleep.

10. The electronic device according to claim 8, wherein the processor is further configured to comprise a plurality of data links, and one of the data links is configured to send the instruction to the coprocessor and receive data of the wireless communication service from the coprocessor.

11. The electronic device according to claim 8, wherein when the instruction indicates that the wireless communication service is wireless broadcasting, and the coprocessor is further configured to:
    initiate a wireless broadcasting service;
    generate a first broadcast message for sending to at least one second device other than the electronic device; and
    generate a broadcast drive instruction for driving the wireless communications device to send the first broadcast message.

12. The electronic device according to claim 11, wherein the first broadcast message comprises at least one of the following: device information of the electronic device, a request of the electronic device for second synchronization data of the at least one second device, or first synchronization data of the electronic device.

13. The electronic device according to claim 8, wherein the instruction indicates that the wireless communication service is wireless scanning, and the coprocessor is further configured to:
    initiate a wireless scanning service; and
    generate a scanning drive instruction for driving the wireless communications device to obtain a second broadcast message from at least one second device other than the electronic device.

14. The electronic device according to claim 8, wherein the coprocessor is further configured to receive, from the wireless communications device, a second broadcast message from at least one second device other than the electronic device.

15. The electronic device according to claim 14, wherein the second broadcast message comprises at least one of the following: device information of the at least one second device, a request of the at least one second device for first synchronization data of the electronic device, or second synchronization data of the at least one second device.

16. The electronic device according to claim 13, wherein the coprocessor is further configured to:
    generate a data filter based on the wireless scanning service; and send the data filter to the wireless communications device, wherein the data filter is configured at least partially to instruct the wireless communications device module to send the second broadcast message to at least one of the processor or the coprocessor.

17. The electronic device according to claim 14, wherein the coprocessor is further configured to:
store the second broadcast message in the coprocessor; and
send the second broadcast message stored in the coprocessor to the processor in response to a request from the processor.

18. The electronic device according to claim 8,
wherein the wireless communication service comprises wireless broadcasting and wireless scanning;
wherein the wireless broadcasting comprises at least one of Bluetooth advertising or Bluetooth low energy advertising; and
wherein the wireless scanning comprises at least one of Bluetooth scanning or Bluetooth low energy scanning.

* * * * *

UNITED STATES PATENT AND TRADEMARK OFFICE
CERTIFICATE OF CORRECTION

PATENT NO. : 12,262,308 B2  
APPLICATION NO. : 17/792648  
DATED : March 25, 2025  
INVENTOR(S) : Le et al.

Page 1 of 1

It is certified that error appears in the above-identified patent and that said Letters Patent is hereby corrected as shown below:

On the Title Page

Page 2, item (56) U.S. Patent Documents, Citation 22: "2016/0100275 A1 4/2016 Miswanadham et al." should read -- 2016/0100275 A1 4/2016 Viswanadham et al. --.

In the Claims

Claim 11, Column 26, Line 29: "when the instruction indicates that the wireless communi-" should read -- the instruction indicates that the wireless communi- --.

Claim 16, Column 27, Line 3: "instruct the wireless communications device module to" should read -- instruct the wireless communications device to --.

Signed and Sealed this  
Sixth Day of May, 2025

Coke Morgan Stewart  
*Acting Director of the United States Patent and Trademark Office*